United States Patent
Goldsmith et al.

(10) Patent No.: US 10,860,002 B2
(45) Date of Patent: Dec. 8, 2020

(54) RECEDING HORIZON REFERENCE GOVERNOR

(71) Applicant: Mitsubishi Electric Research Laboratories, Inc., Cambridge, MA (US)

(72) Inventors: Abraham Goldsmith, Boston, MA (US); Stefano Di Cairano, Newton, MA (US); Uros Kalabic, Jamaica Plain, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 108 days.

(21) Appl. No.: 15/924,582

(22) Filed: Mar. 19, 2018

(65) Prior Publication Data

US 2019/0286106 A1 Sep. 19, 2019

(51) Int. Cl.
*G05B 19/41* (2006.01)

(52) U.S. Cl.
CPC .... *G05B 19/41* (2013.01); *G05B 2219/37347* (2013.01); *G05B 2219/40519* (2013.01); *G05B 2219/42058* (2013.01)

(58) Field of Classification Search
CPC .......... G05B 19/41; G05B 2219/42058; G05B 2219/40519; G05B 2219/37347
USPC ........................................................ 700/188
See application file for complete search history.

(56) References Cited

U.S. PATENT DOCUMENTS

| | | | | |
|---|---|---|---|---|
| 5,659,667 A | * | 8/1997 | Buescher | G05B 13/027 706/23 |
| 8,046,089 B2 | * | 10/2011 | Renfro | G05B 17/02 700/28 |
| 10,035,266 B1 | * | 7/2018 | Kroeger | B25J 9/1664 |
| 2002/0122604 A1 | * | 9/2002 | Woodford | G01S 13/904 382/280 |
| 2007/0085850 A1 | * | 4/2007 | Hong | G05B 19/41 345/442 |
| 2011/0301723 A1 | * | 12/2011 | Pekar | G05B 13/048 700/29 |
| 2013/0096700 A1 | * | 4/2013 | Tezuka | G05B 19/4068 700/83 |

(Continued)

*Primary Examiner* — Kenneth M Lo
*Assistant Examiner* — Mohammed Shafayet
(74) *Attorney, Agent, or Firm* — Gennadiy Vinokur; James McAleenan; Hironori Tsukamoto

(57) ABSTRACT

A control system for controlling an operation of a processing machine positioning a worktool according to a processing pattern to machine a workpiece. A memory to store a reference trajectory defined in a spatial domain by a sequence of points for positioning the worktool and defined in a time domain by a relative time for positioning the worktool on each point of the reference trajectory. A sensor to determine a state of the processing machine. A reference governor to iteratively process the reference trajectory over a receding horizon including multiple windows of points, and analytically update the relative time for positioning the worktool for some points of the reference trajectory within the receding horizon to satisfy constraints on the operation of the processing machine having the state. A controller to control the operation of the processing machine using control inputs causing the worktool to track the updated reference trajectory.

16 Claims, 18 Drawing Sheets

(56) References Cited

U.S. PATENT DOCUMENTS

| | | | |
|---|---|---|---|
| 2013/0190898 A1* | 7/2013 | Shilpiekandula | G05B 19/19 700/19 |
| 2013/0307459 A1* | 11/2013 | Tian | G05B 19/25 318/570 |
| 2014/0114463 A1* | 4/2014 | Shilpiekandula | G05B 19/19 700/173 |
| 2014/0277600 A1* | 9/2014 | Kolinsky | G05B 13/04 700/29 |
| 2015/0148924 A1* | 5/2015 | Di Cairano | G05B 17/02 700/86 |
| 2015/0241865 A1* | 8/2015 | Haghighat | G05B 19/195 700/166 |
| 2015/0355622 A1* | 12/2015 | Bretschneider | G05B 19/182 700/159 |
| 2016/0147203 A1* | 5/2016 | Di Cairano | G05B 13/042 700/30 |
| 2016/0288256 A1* | 10/2016 | Di Cairano | B23K 26/082 |
| 2016/0357169 A1* | 12/2016 | Di Cairano | G05B 13/048 |
| 2017/0248935 A1* | 8/2017 | Koide | G05B 19/29 |
| 2018/0164774 A1* | 6/2018 | Goldsmith | G05B 19/402 |
| 2018/0203433 A1* | 7/2018 | Liu | G05B 19/408 |

\* cited by examiner

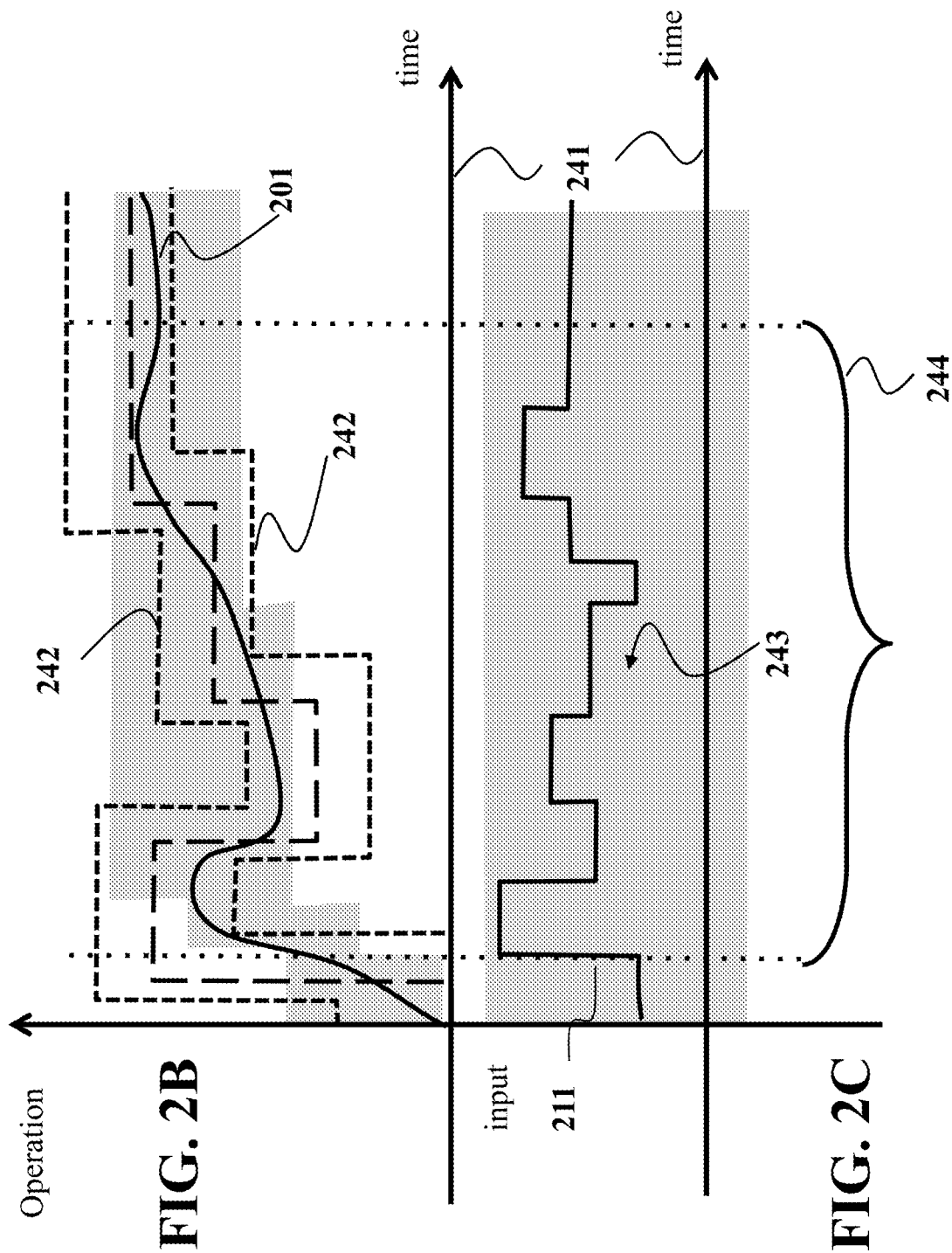

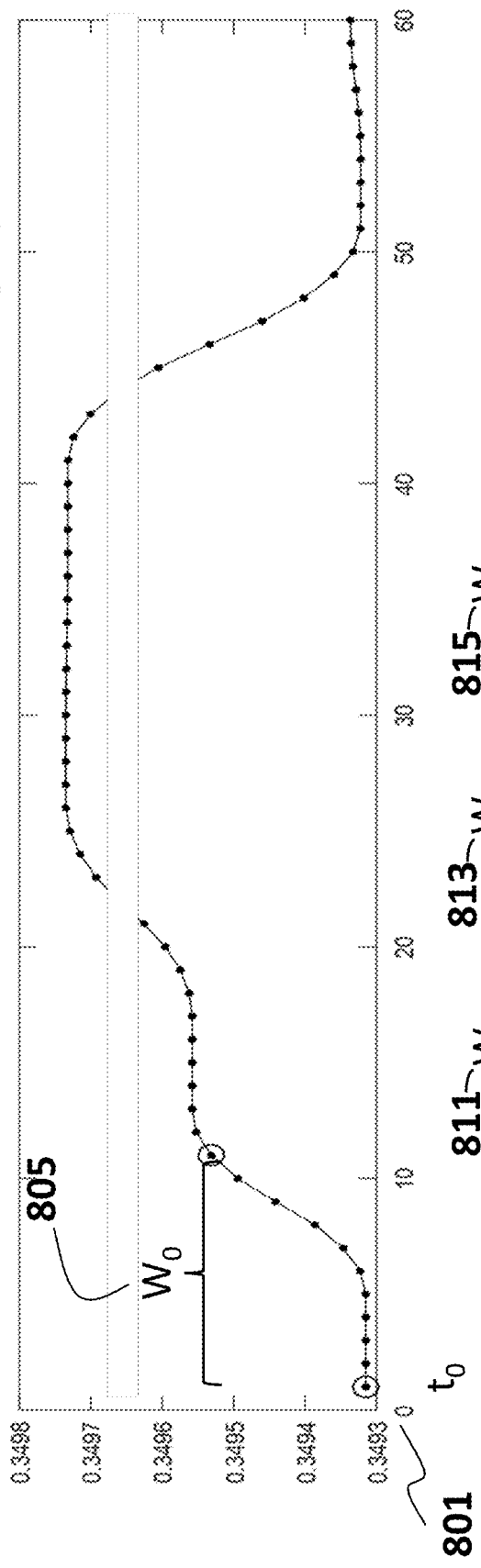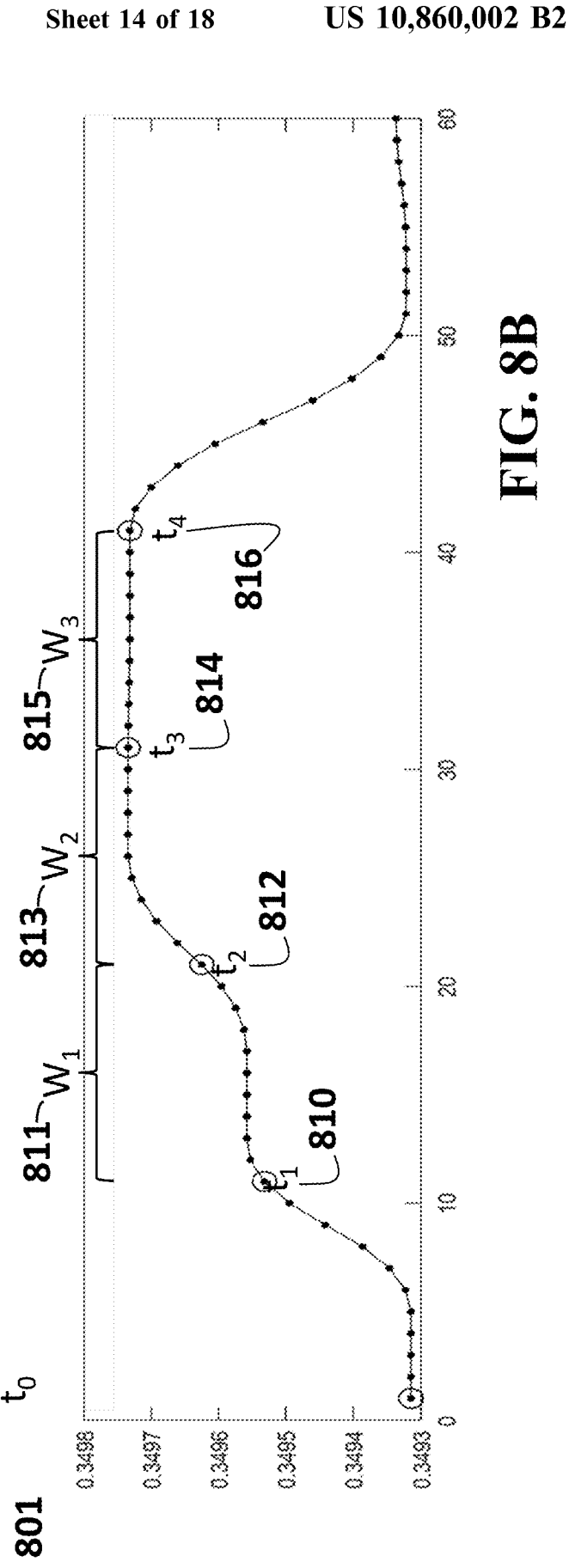

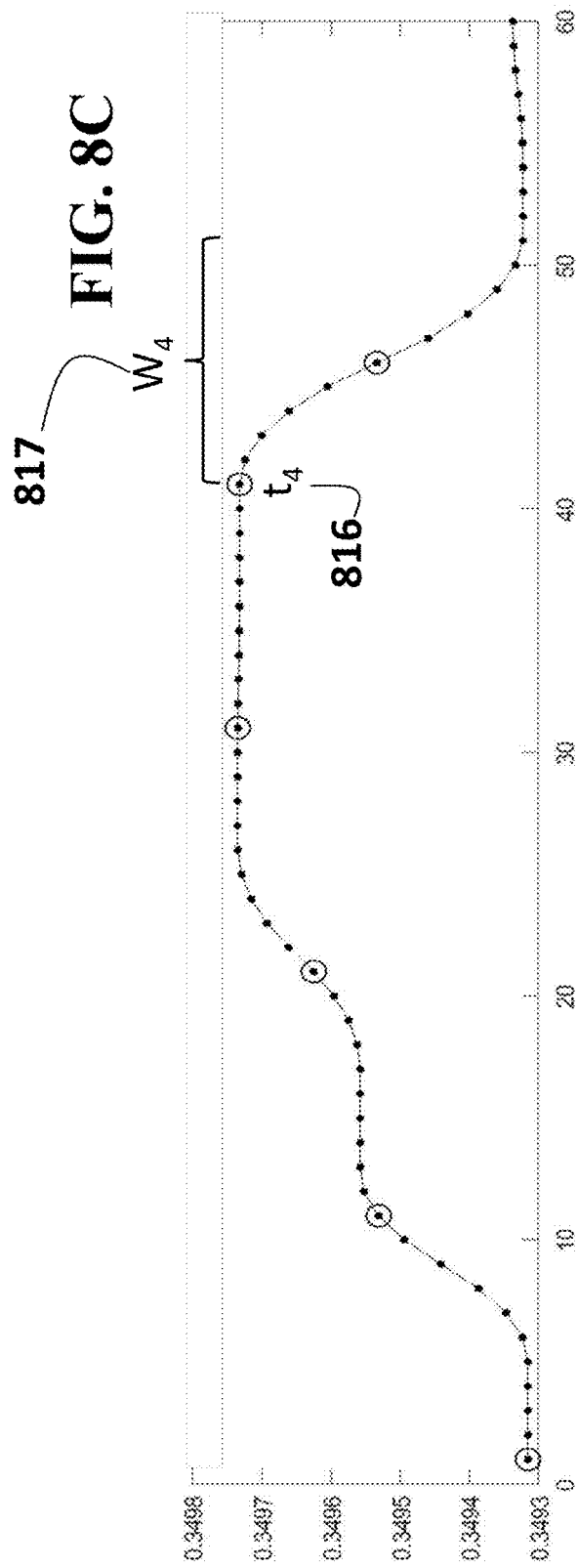
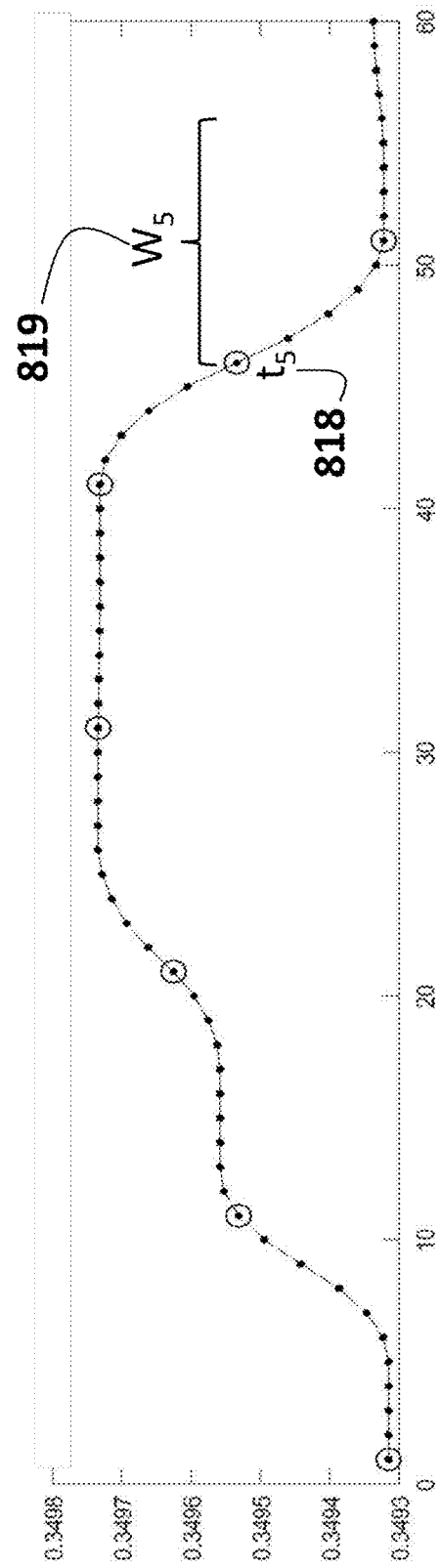

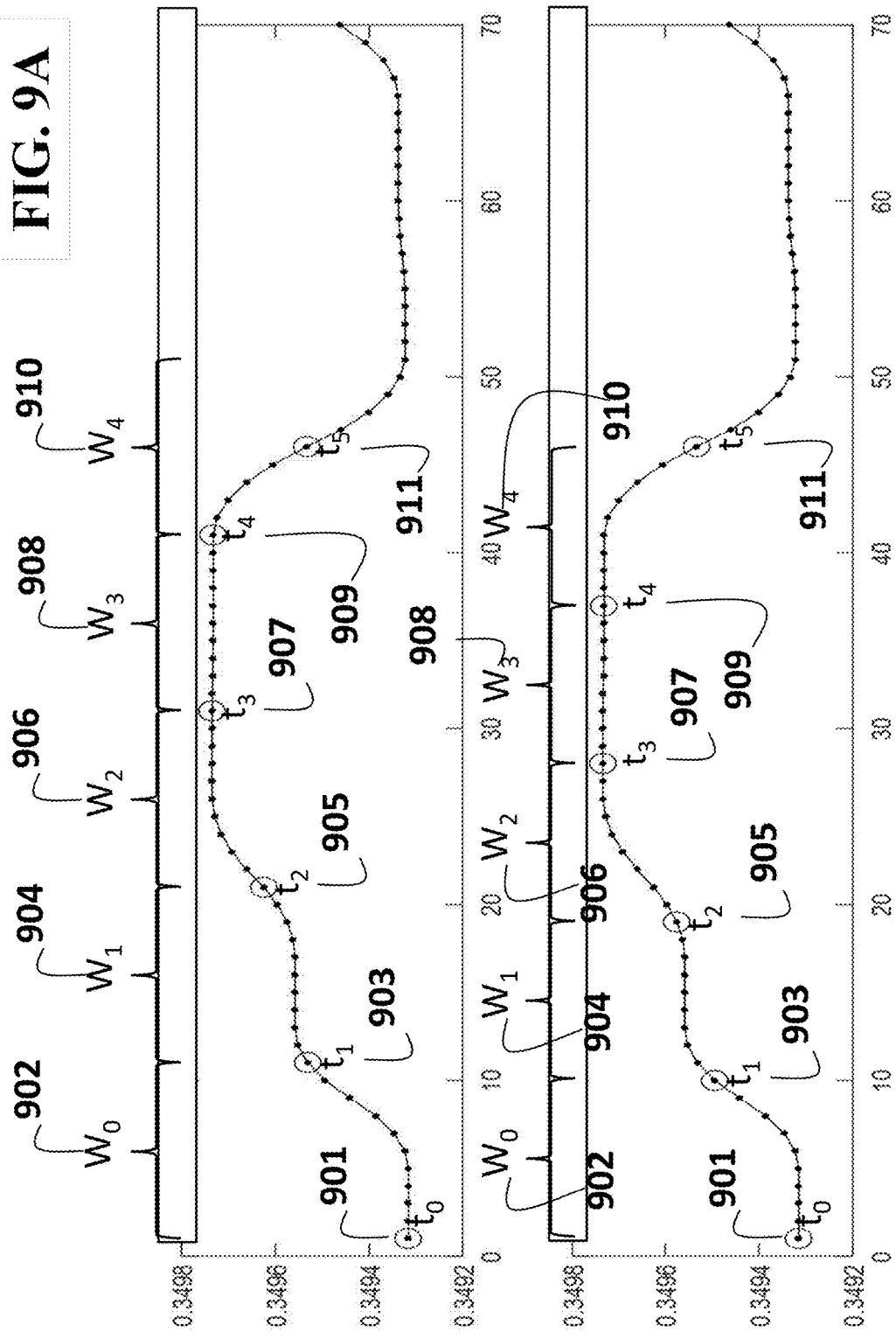

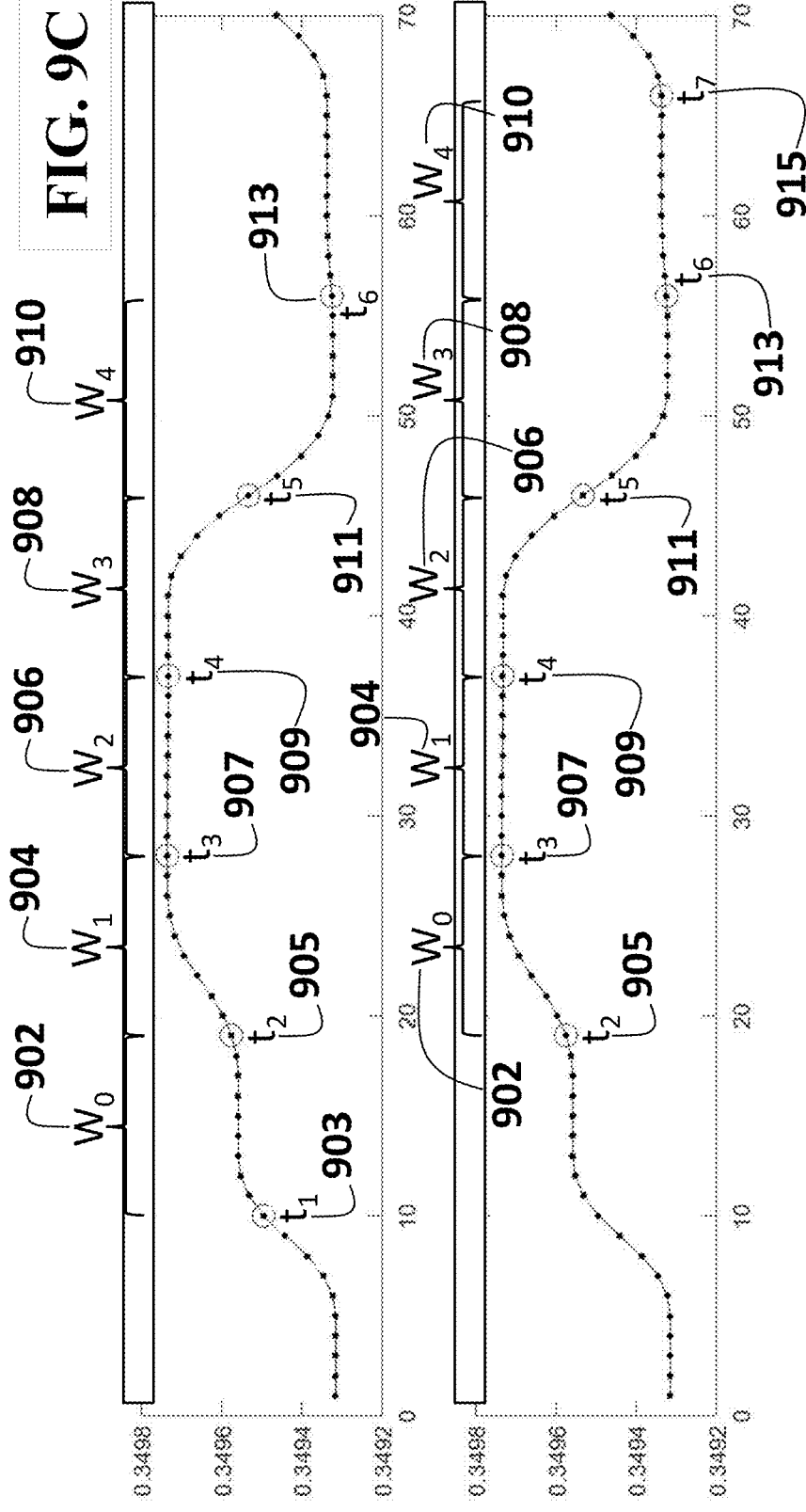

RECEDING HORIZON REFERENCE GOVERNOR

FIELD

The present disclosure relates generally to controlling machines, and more particularly, to controlling an operation of a processing machine positioning a worktool according to a processing pattern.

BACKGROUND

In conventional computer numerically controlled (CNC) machining, a tool-head is moved relatively to a work-piece according to a predetermined pattern to perform machining of the work-piece. The machining can include various types of processing of the work-piece, such as cutting or drilling the work-piece.

Cutting features from sheet material according to a pattern is a common manufacturing process. Generally, a cutting head of a laser cutting machine is translated in a bounded plane along orthogonal axes.

Control of the laser cutter is performed by the CNC following a prescribed set of instructions, sometimes implemented as "NC-code," or "G-code." Typical conventional instructions cause the laser cutter to cut the pattern according to a reference trajectory. However, conventional manufacturing processes fail when the reference trajectory generation needs to consider various constraints of operation of the laser cutting machine, due to the generation of the reference trajectory being computationally impractical for real-time implementation, among other reasons. For example, some conventional methods, see, e.g., U.S. Pat. Nos. 5,452,275 and 7,710,060, use frequency separation techniques to assign the task of positioning the laser beam to two actuators. Wherein, the processing pattern is filtered by a low pass filter. The filtered signal becomes a reference trajectory for one actuator, while a difference between the processing pattern and the filtered signal becomes a reference trajectory for another actuator. However, the filtering does not consider various constraints of the actuators, such as constraints on the accelerations or velocities. Furthermore, there is no guarantee that the separation in frequencies provides the optimal reference trajectories. Further, such processes are computationally expensive and not practical for meeting the standards of today's technological practices.

Accordingly, there is a need for a system and a method for controlling an operation of a processing machine that assures the feasibility of the generated reference trajectory, while maintaining desirable characteristics in the reference trajectory and limiting computational complexity.

SUMMARY

Embodiments of the present disclosure provide for systems and methods controlling operations of a processing machine positioning a worktool according to a processing pattern to machine a workpiece.

The present disclosure provides for processing machine systems that can include one or multiple actuators for positioning a worktool. The processing machines can include redundant actuators for jointly positioning the worktool along each axis of motion. Examples of some processing machines include a laser-processing system for cutting or drilling a workpiece, wherein the workpiece can comprise of one or more materials having varying thickness, i.e. metal, composite, or plastic. These processing machines position the worktool according to a pattern represented by a reference trajectory defined in a spatial domain by locations of points for positioning the worktool according to, and defined in a time domain, by a relative time for positioning the worktool on each point of the reference trajectory. The relative time for positioning different points is constant. For example, the points of the reference trajectory are separated by a unit of time, e.g., 1 millisecond (ins). Further, some embodiment may provide for determining a reference trajectory online, i.e., during cutting, such that the online generation of the reference trajectory considers the actual state of the laser processing machine, and is more accurate than a conventional offline generation of the reference trajectory. Noted is that the conventional offline generation of the reference trajectory relies only on a dynamic model of the laser-cutting machine, which is a mathematical representation of the physical process, which is inaccurate. In addition, the dynamic model may fail to consider various outside disturbances acting on the laser-processing machine during use, and/or may fail to account for wear and/or tear of different components of the machine.

Some processing machines of the present disclosure can include controllers that process points at a uniform rate in the time domain and a variable rate in the spatial domain. In addition, these controllers may process, at most, a certain number of points, i.e. M points, from the time domain reference trajectory per unit of time. Each unit of time, for example, can be called a sample period. The set of at most M points may be called a window. Wherein, for each sample period, a reference governor of the laser-processing system can select a subset of points from a window consisting of a current point and up to M future points.

Some embodiments of the present disclosure include a realization that a reference governor of the laser-processing system can operate using multiple (N) windows, rather than a single window. Wherein, learned through experimentation when taken together, these multiple windows can form a horizon over which the reference governor of the laser-processing system can operate, i.e. wherein the receding horizon reference governor can operate. For example, each time a step is taken forward in time, the receding horizon reference governor discards the window at the beginning of the horizon, adds a window at the end of the horizon, and then processes those windows sequentially. In this way, learned through experimentation, the horizon is always receding into too future.

In other words, this means that each window will be processed N times. During experimentation the importance of our realization that operating on multiple (N) windows is truly important (i.e. instead of operating with a single window), is because the conventional reference governor, working with the single window, generates a trajectory, resulting in undesirable characteristics. These undesirable characteristics can include large accelerations and large changes in velocity, which is simply considered a failure according to embodiments of the present disclosure. Learned through experimentation, when experimenting with an approach of converting a spatial cutting pattern into a time sampled trajectory in order for it to be processed by the machine, i.e. either for an online or offline case. The time sampled trajectory was infeasible with respect to the physical constraints of the machine at the current time, either because the acceleration of trajectory exceeded the maximum allowable acceleration for the machine, and/or that the machine was driven to a state where future points could not be processed without violating a constraint. Thus, the above noted approaches were not furthered experimented. Other experimentations included generating the time sampled trajectory by the reference governor, however, these experiments resulted in undesirable characteristics, for example rapid changes in acceleration and velocity, as noted above, or were too computationally complex to be implemented in an online controller.

Some conventional methods attempted to overcome this problem, or to change this behavior, by lowering the constraint on maximum acceleration. However, such conventional attempts resulted in a trajectory that is not practical for many reasons, including being computationally expensive along with being computationally slow. Whereas, according to embodiments of the present disclosure, using multiple windows resulted in being able to smooth the acceleration of the trajectory without lowering a limit on peak acceleration. During experimentation one failed embodiment attempted for smoothing out acceleration, included an approach of applying a low pass filter to the trajectory. However, this particular attempted embodiment during experimentation failed since the resulting trajectory could not achieve to satisfy the machine constraints, according to the current embodiments of the present disclosure.

According to some embodiments of the present disclosure, an averaging filter may be applied to a number of points, M, that reference governor can select for processing from each window, such that the resulting trajectory results in having a desired low acceleration along with maintaining the assurances of constraint satisfaction. It is this combination of the standard reference governor, a receding horizon for processing, and a filter on the number of points processed in each window of the receding horizon, that comprise the present invention.

Some embodiments are based on another recognition of the possibility to determine a reference trajectory offline using, e.g., a model of the system dynamics. For example, some embodiments can be determined using a computational power of the processing machine before beginning processing of the workpiece. In such a manner, the computation of the reference trajectory can be spread over the extended period of computational time. Further, the reference trajectory can be determined by an external server with sufficient computational power. However, under specific conditions, such a reference trajectory may be infeasible, e.g., due to imperfections of the dynamic model.

To that end, some embodiments provide a method ensuring a feasibility of the processing of the reference trajectory that satisfies constraints on the operation of the processing machine. For example, the processing machine can fail to process a given reference trajectory by commanding an actuator to move the worktool with the speed exceeding its limitations. Accordingly, there is a need to modify the reference trajectory in the time domain, while preserving the reference trajectory in the spatial domain. For example, one embodiment increases the time of positioning the worktool between at least some points of the reference trajectory to ensure the feasibility of the processing.

Specifically, some methods include modifying the time domain of the reference trajectory in real time, i.e., concurrently with the controlling of the processing machine. The present disclosure includes the realization that the time domain of the reference trajectory can be modified analytically as contrasted with various optimization techniques. In particular, modifying sequentially for each period of time. Such a realization allows selecting the period of time to be the sampling period of the slow actuator, to enable the processor to modify the time domain of the reference trajectory concurrently with the controlling the motion of the actuators. For example, some embodiments include expanding units of time separating subsequent points to satisfy the constraints on operation. Wherein, such an extension can be a computationally straightforward analytical operation.

The present disclosure systems and methods can be utilized with laser cutting systems, in which a laser cutting machine can prescribe a reference pattern onto a sheet of metal. The reference pattern can include a sequence of points, which makes up the reference trajectory. In regard to the reference trajectory, the laser cutting system may slowdown due to an anticipation of constraint-violation in the near future. In some machines, where the laser can only be turned on and off, and laser intensity cannot be modified in proportion to the slow-down even by using on-off modulation. In such machines, since the laser must continuously cut the pattern, places of slow-down become overly heated, resulting in a poor cut. The methods of the present disclosure can mitigate the slow-down in the laser cutter system. Wherein some methods of the present disclosure look ahead at the number of points that can be machined in the pattern while staying within the constraints, and redistributes these points so they are machined evenly over the look-ahead horizon. In other words, the even distribution of these points can result in mitigating the slow-down.

For example, the present disclosure realized that such a sequential modification of the reference trajectory can impose two requirements for modifying segments of the reference trajectory. The first requirement ensures the feasibility of processing the segment of the reference trajectory, such that the constraints on the processing and the movements of the actuators can be satisfied. This can ensure the feasibility of processing of the pattern. However, the second requirement, which follows for the sequential processing of the reference trajectory, also ensures that the processing of the segment of the reference trajectory does not move the processing machine in such a state that necessitate the violation of the constraints for processing any future segments of the reference trajectory. If these two requirements are satisfied, the sequential modification can generate the entire feasible reference trajectory.

We further realized that if the speed of processing of the reference trajectory places the processing machine in such a state that allows the processing machine to maintain the worktool at the processed point for indefinite period of time without violation of the constraints, such speed allows the processing machine to adapt to any variation of the subsequent segments of the reference trajectory. Based on our realization, we learned the ability of dynamics of the processing machine to preserve its state after the current processing ensures that the processing does not jeopardize the future processing, and thus, such a processing satisfies the second requirement.

The trajectory of the redundant actuators of the present disclosure are determined subject to constraints on motion of the actuators, as noted above. Wherein the constraints on motion can include physical constraints on the operation of the actuators, imposed, e.g., legal, constraints on the motion, and constraints on mutual relationship of the operations of the redundant actuators. For example, one embodiment discloses the construction of an invariant set or regions composed all possible combinations of the machine state and reference inputs for which the machine constraints are satisfied and future processing is guaranteed. The invariant regions can be used to test a portion of a reference and modify it if necessary so that it is feasible and satisfies the constraints.

To better understand the receding horizon reference governor, as noted above, at least one aspect is that the receding horizon controller can be a model predictive control (MPC), that is based on iterative, finite-horizon optimization. The optimization can be performed over a prediction horizon that is shifted forward at each sample time. For this reason, the MPC can be identified or called the receding horizon control.

Specifically, the forward shifting nature of the prediction horizon results in processing the same portions of the reference trajectory multiple times. At each step of the control, the receding horizon includes previously processed portions of the reference trajectory and newly added, i.e., unprocessed, portion of the reference trajectory. Only the newly added portion can include infeasible points. Due to the principles of the forward shifting, the new portions are appended at the end of the prediction horizon. Thus, even if the newly added portion includes an infeasible point at its beginning, the infeasible point is preceded with all the points of previously processed portions. Thus, the analytical modification of the feasible part of the receding horizon ending at the infeasible point can avoid undesirable slow-down of the machining while maintaining feasibility in the already processed section.

For example, in some embodiments, a prediction horizon includes multiple windows, and each window includes multiple points. The receding horizon of a current iteration is formed by removing a window of points from the beginning of the receding horizon processed during a previous iteration and adding an unprocessed window of points at the end of the receding horizon. In such a manner, only the unprocessed window can potentially include an infeasible point, which allows, upon detecting violation of the constraints at an infeasible point within that window of the receding horizon, to update the reference trajectory by assigning the processing time allocated for the entire reseeding horizon to a feasible portion of the receding horizon ending at the infeasible point.

In some embodiments, the processing machine can include redundant actuators for jointly positioning the worktool along each axis of motion. The redundant actuators include a fast actuator and a slow actuator, i.e., a range of motion of the slow actuator is greater than a range of motion of the fast actuator, and acceleration and velocity constraints of the fast actuator are greater than acceleration and velocity constraints of the slow actuator. In those embodiments, the reference trajectory is generated as a trajectory for the slow actuator such that the desired processing position is within the range of motion of the fast actuator. In such a manner, the reference trajectory decreases the time of processing the pattern, but can be infeasible. The modification of the reference trajectory over the receding horizon slows the processing analytically to place the updated reference trajectory within the range of motion of the fast actuator while satisfying all other dynamic constraints on the motion of the slow actuator.

Accordingly, at least one aspect of the present disclosure is that the receding horizon is ending at the infeasible point. Further, the present disclosure includes the feature of removing a window of points from the beginning of the receding horizon processed during a previous iteration, and generation of the reference trajectory is as a trajectory for the slow actuator such that the desired processing position is within the range of motion of the fast actuator.

Accordingly, one embodiment discloses a control system for controlling an operation of a processing machine positioning a worktool according to a processing pattern to machine a workpiece. The system includes a memory to store a reference trajectory defined in a spatial domain by a sequence of points for positioning the worktool and defined in a time domain by a relative time for positioning the worktool on each point of the reference trajectory. A sensor to determine a state of the processing machine. A reference governor to iteratively process the reference trajectory over a receding horizon including multiple windows of points. The reference governor analytically updates the relative time for positioning the worktool for at least some points of the reference trajectory within the receding horizon to satisfy constraints on the operation of the processing machine having the state. Wherein the reference governor forms the receding horizon for processing during a current iteration by removing a window of points from the beginning of the receding horizon processed during a previous iteration and adding an unprocessed window of points at the end of the receding horizon. A controller to control the operation of the processing machine using control inputs causing the worktool to track the updated reference trajectory.

An embodiment of the present disclosure includes a control system for controlling an operation of a processing machine positioning a worktool according to a processing pattern to machine a workpiece. The system includes a memory to store a reference trajectory defined in a spatial domain by a sequence of points for positioning the worktool and defined in a time domain by a relative time for positioning the worktool on each point of the reference trajectory. A sensor to determine a state of the processing machine. A reference governor to iteratively process the reference trajectory over a receding horizon including multiple windows of points The reference governor analytically updates the relative time for positioning the worktool for at least some points of the reference trajectory within the receding horizon to satisfy constraints on the operation of the processing machine having the state. Wherein the reference governor forms the receding horizon for processing during a current iteration by removing a window of points from the beginning of the receding horizon processed during a previous iteration and adding an unprocessed window of points at the end of the receding horizon. A controller to control the operation of the processing machine using control inputs causing the worktool to track the updated reference trajectory.

Another embodiment discloses a processing machine including a method for controlling an operation of a processing machine positioning a worktool according to a processing pattern to machine a workpiece. The method including using a memory having stored data including a reference trajectory defined in a spatial domain by a sequence of points for positioning the worktool, and defined in a time domain by a relative time for positioning the worktool on each point of the reference trajectory. Using a sensor to determine a state of the processing machine. Receiving, via an input interface in communication with the sensor, data regarding the state of the processing machine. Using a reference governor to iteratively process the reference trajectory over a receding horizon including multiple windows of points, and to analytically update the relative time for positioning the worktool for at least some points of the reference trajectory within the receding horizon to satisfy constraints on the operation of the processing machine having the state. Wherein the reference governor forms the receding horizon for processing during a current iteration by removing a window of points from the beginning of the receding horizon processed during a previous iteration and adding an unprocessed window of points at the end of the receding horizon. Controlling, via a controller, the operation of the processing machine using control inputs causing the worktool to track the updated reference trajectory. Wherein the reference governor is in communication with the input interface and the memory.

Another embodiment discloses a processing machine including a control system for controlling an operation of a processing machine positioning a worktool according to a processing pattern to machine a workpiece. A memory to store a reference trajectory defined in a spatial domain by a sequence of points for positioning the worktool and defined in a time domain by a relative time for positioning the worktool on each point of the reference trajectory. Wherein the points of the reference trajectory are sampled on a uniform timescale in the time domain and irregularly in the spatial domain. The system comprising: a sensor to determine a state of the processing machine; a reference governor to iteratively process the reference trajectory over a receding horizon including multiple windows of points, and to analytically update the relative time for positioning the worktool for at least some points of the reference trajectory within the receding horizon to satisfy constraints on the operation of the processing machine having the state, wherein the reference governor forms the receding horizon for processing during a current iteration by removing a window of points from the beginning of the receding horizon processed during a previous iteration and adding an unprocessed window of points at the end of the receding horizon; and a controller to control the operation of the processing machine using control inputs causing the worktool to track the updated reference trajectory.

Further features and advantages will become more readily apparent from the following detailed description when taken in conjunction with the accompanying drawings.

DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2B and FIG. 2C are graphs illustrating a timing diagram of an operation of a processing machine, according to embodiments of the present disclosure;

FIG. 8A and FIG. 8B are graphs illustrating the operation of the standard reference governor on a sequence of points in a reference trajectory, according to embodiments of the present disclosure;

FIG. 8C and FIG. 8D are graphs illustrating the operation of the standard reference governor on a sequence of points in a reference trajectory, according to embodiments of the present disclosure;

FIG. 9A and FIG. 9B are graphs illustrating the operation of the receding horizon reference governor on a sequence of points in a reference trajectory, according to embodiments of the present disclosure;

FIG. 9C and FIG. 9D are graphs illustrating the operation of the receding horizon reference governor on a sequence of points in a reference trajectory, according to embodiments of the present disclosure.

Figure 1A:
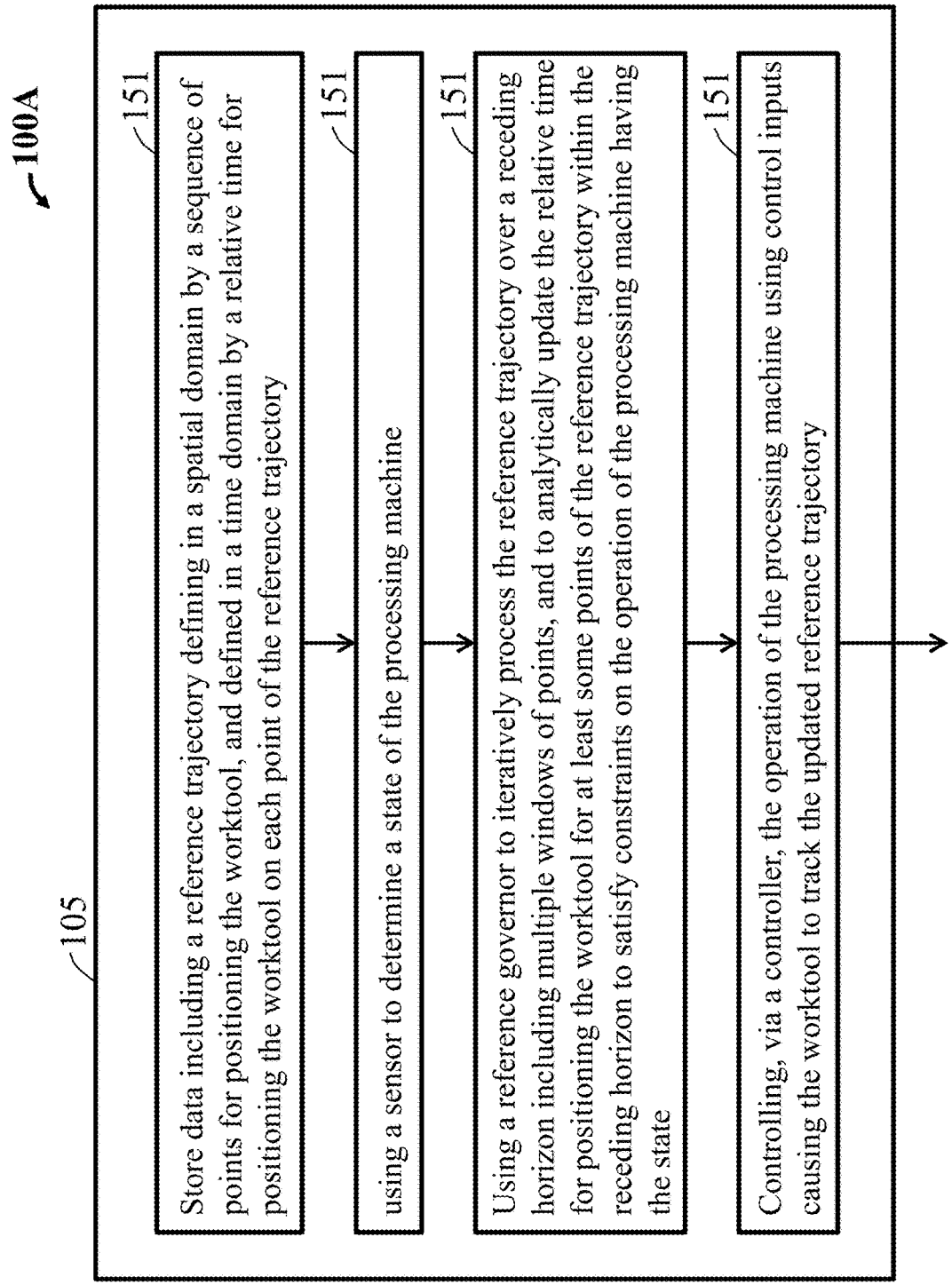
FIG. 1A is a block diagram illustrating at least one method for controlling an operation of a processing machine positioning a worktool according to a processing pattern, according to embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Overview

Embodiments of the present disclosure provide for systems and methods controlling operations of a processing machine positioning a worktool according to a processing pattern to machine a workpiece.

Some embodiments of the present disclosure include a realization that a reference governor of the laser-processing system can operate using multiple (N) windows, rather than a single window. Wherein, learned through experimentation when taken together, these multiple windows can form a horizon over which the reference governor of the laser-processing system can operate, i.e. wherein the Receding Horizon Reference Governor (RRHG) can operate. For example, each time a step is taken forward in time, the RRHG discards the window at the beginning of the horizon, adds a window at the end of the horizon, and then processes those windows sequentially. In this way, learned through experimentation, the horizon is always receding into too future. In other words, this means that each window will be processed N times.

At least one aspect of the Receding Horizon Reference Governor (RRHG) method of the present disclosure can include some functions as follows:

Step (1): initializing a storage array B with N elements;
Step (2): setting each element to M; then, let i=0;
Step (3): at time t+I, the controller can compute a state of the machine x(t+i);
Step (4): the current window W(i) can be defined as the current spatial point and the B(i) subsequent points;
Step (5): the reference governor using the state to select a set of spatial points from W(i) for processing during sample period t+I;
Step (6): if the number of spatial points selected in step (5) is less than M, set some or all of the elements of B to a value less than M, which elements and the value are implementation specific;
Step (7): the reference governor can use the set of points to compute a control input u(t+i);
Step (8): set the current point to the last point in the set;
Step (9): i=i+1;
Step (10): repeat 2-9 N times;
Step (11): repeat steps 2-10 until the elements of B do not change;
Step (12) apply u(t) to the system (the command computed from the first window); step (13) t=t+1; and
Step (14) finally, repeat steps 3-13 until the entire spatial reference has been processed.

Some embodiments provide a method ensuring a feasibility of the processing of the reference trajectory that satisfies constraints on the operation of the processing machine. For example, the processing machine can fail to process a given reference trajectory by commanding an actuator to move the worktool with the speed exceeding its limitations. Accordingly, there is a need to modify the reference trajectory in the time domain, while preserving the reference trajectory in the spatial domain. For example, one embodiment increases the time of positioning the worktool between at least some points of the reference trajectory to ensure the feasibility of the processing.

Specifically, some methods include modifying the time domain of the reference trajectory in real time, i.e., concurrently with the controlling of the processing machine. The present disclosure includes the realization that the time domain of the reference trajectory can be modified analytically as contrasted with various optimization techniques. In particular, modifying sequentially for each period of time. Such a realization allows selecting the period of time to be the sampling period of the slow actuator, to enable the processor to modify the time domain of the reference trajectory concurrently with the controlling the motion of the actuators. For example, some embodiments include expanding units of time separating subsequent points to satisfy the constraints on operation. Wherein, such an extension can be a computationally straightforward analytical operation.

The present disclosure systems and methods can be utilized with laser cutting systems, in which a laser cutting machine can prescribe a reference pattern onto a sheet of metal. The reference pattern can include a sequence of points, which makes up the reference trajectory. In regard to the reference trajectory, the laser cutting system may slow-down due to an anticipation of constraint-violation in the near future. In some machines, where the laser can only be turned on and off, and laser intensity cannot be modified in proportion to the slow-down even by using on-off modulation. In such machines, since the laser must continuously cut the pattern, places of slow-down become overly heated, resulting in a poor cut. The methods of the present disclosure can mitigate the slow-down in the laser cutter system. Wherein some methods of the present disclosure look ahead at the number of points that can be machined in the pattern while staying within the constraints, and redistributes these points so they are machined evenly over the look-ahead horizon. In other words, the even distribution of these points can result in mitigating the slow-down.

For example, the present disclosure realized that such a sequential modification of the reference trajectory can impose two requirements for modifying segments of the reference trajectory. The first requirement ensures the feasibility of processing the segment of the reference trajectory, such that the constraints on the processing and the movements of the actuators can be satisfied. This can ensure the feasibility of processing of the pattern. However, the second requirement, which follows for the sequential processing of the reference trajectory, also ensures that the processing of the segment of the reference trajectory does not move the processing machine in such a state that necessitate the violation of the constraints for processing any future segments of the reference trajectory. If these two requirements are satisfied, the sequential modification can generate the entire feasible reference trajectory.

We further realized that if the speed of processing of the reference trajectory places the processing machine in such a state that allows the processing machine to maintain the worktool at the processed point for indefinite period of time without violation of the constraints, such speed allows the processing machine to adapt to any variation of the subsequent segments of the reference trajectory. Based on our realization, we learned the ability of dynamics of the processing machine to preserve its state after the current processing ensures that the processing does not jeopardize the future processing, and thus, such a processing satisfies the second requirement.

The trajectory of the redundant actuators of the present disclosure are determined subject to constraints on motion of the actuators, as noted above. Wherein the constraints on motion can include physical constraints on the operation of the actuators, imposed, e.g., legal, constraints on the motion, and constraints on mutual relationship of the operations of the redundant actuators. For example, one embodiment discloses the construction of an invariant set or regions composed all possible combinations of the machine state and reference inputs for which the machine constraints are satisfied and future processing is guaranteed. The invariant regions can be used to test a portion of a reference and modify it if necessary so that it is feasible and satisfies the constraints.

To better understand the receding horizon reference governor, as noted above, at least one aspect is that the receding horizon controller can be a model predictive control (MPC), that is based on iterative, finite-horizon optimization. The optimization can be performed over a prediction horizon that is shifted forward at each sample time. For this reason, the MPC can be identified or called the receding horizon control.

Specifically, the forward shifting nature of the prediction horizon results in processing the same portions of the reference trajectory multiple times. At each step of the control, the receding horizon includes previously processed portions of the reference trajectory and newly added, i.e., unprocessed, portion of the reference trajectory. Only the newly added portion can include infeasible points. Due to the principles of the forward shifting, the new portions are appended at the end of the prediction horizon. Thus, even if the newly added portion includes an infeasible point at its beginning, the infeasible point is preceded with all the points of previously processed portions. Thus, the analytical modification of the feasible part of the receding horizon ending at the infeasible point can avoid undesirable slow-down of the machining while maintaining feasibility in the already processed section.

For example, in some embodiments, a prediction horizon includes multiple windows of points, and each window includes multiple points. The receding horizon of a current iteration is formed by removing a window of points from the beginning of the receding horizon processed during a previous iteration and adding an unprocessed window of points at the end of the receding horizon. In such a manner, only the unprocessed window can potentially include an infeasible point, which allows, upon detecting violation of the constraints at an infeasible point within that window of the receding horizon, to update the reference trajectory by assigning the processing time allocated for the entire reseeding horizon to a feasible portion of the receding horizon ending at the infeasible point.

In other words, the receding horizon is ending at the infeasible point. Further, one of many novel aspects of the present disclosure include the feature of removing a window of points from the beginning of the receding horizon processed during a previous iteration, and generation of the reference trajectory as a trajectory for the fast actuator with a range of motion of the slow actuator. Further still, another novel aspect of the present disclosure, among many, include the reference governor, upon detecting violation of the constraints at an infeasible point within one window of the receding horizon, analytically updates the points by assigning the processing time allocated for the entire reseeding horizon to a feasible portion of the receding horizon ending at the infeasible point and also the reference trajectory in a memory is not explicitly shown.

In some embodiments, the processing machine can include redundant actuators for jointly positioning the worktool along each axis of motion. The redundant actuators include a fast actuator and a slow actuator, i.e., a range of motion of the slow actuator is greater than a range of motion of the fast actuator, and acceleration and velocity constraints of the fast actuator are greater than acceleration and velocity constraints of the slow actuator. In those embodiments, the reference trajectory is generated as a trajectory for the slow actuator such that the desired processing position is within the range of motion of the fast actuator. In such a manner, the reference trajectory decreases the time of processing the pattern, but can be infeasible. The modification of the reference trajectory over the receding horizon slows the processing analytically to place the updated reference trajectory within the range of motion of the fast actuator while satisfying all other dynamic constraints on the motion of the slow actuator.

Accordingly, at least one aspect of the present disclosure is that the receding horizon is ending at the infeasible point. Further, the present disclosure includes the feature of removing a window of points from the beginning of the receding horizon processed during a previous iteration, and generation of the reference trajectory is as a trajectory for the slow actuator such that the desired processing position is within the range of motion of the fast actuator.

Accordingly, one embodiment discloses a control system for controlling an operation of a processing machine positioning a worktool according to a processing pattern to machine a workpiece. The system includes a memory to store a reference trajectory defined in a spatial domain by a sequence of points for positioning the worktool and defined in a time domain by a relative time for positioning the worktool on each point of the reference trajectory. A sensor to determine a state of the processing machine. A reference governor to iteratively process the reference trajectory over a receding horizon including multiple windows of points. The reference governor analytically updates the relative time for positioning the worktool for at least some points of the reference trajectory within the receding horizon to satisfy constraints on the operation of the processing machine having the state. Wherein the reference governor forms the receding horizon for processing during a current iteration by removing a window of points from the beginning of the receding horizon processed during a previous iteration and adding an unprocessed window of points at the end of the receding horizon. A controller to control the operation of the processing machine using control inputs causing the worktool to track the updated reference trajectory.

FIG. 1A is a block diagram illustrating at least one method for controlling an operation of a processing machine positioning a worktool according to a processing pattern, according to embodiments of the present disclosure. The method 100A.

Figure 1B:
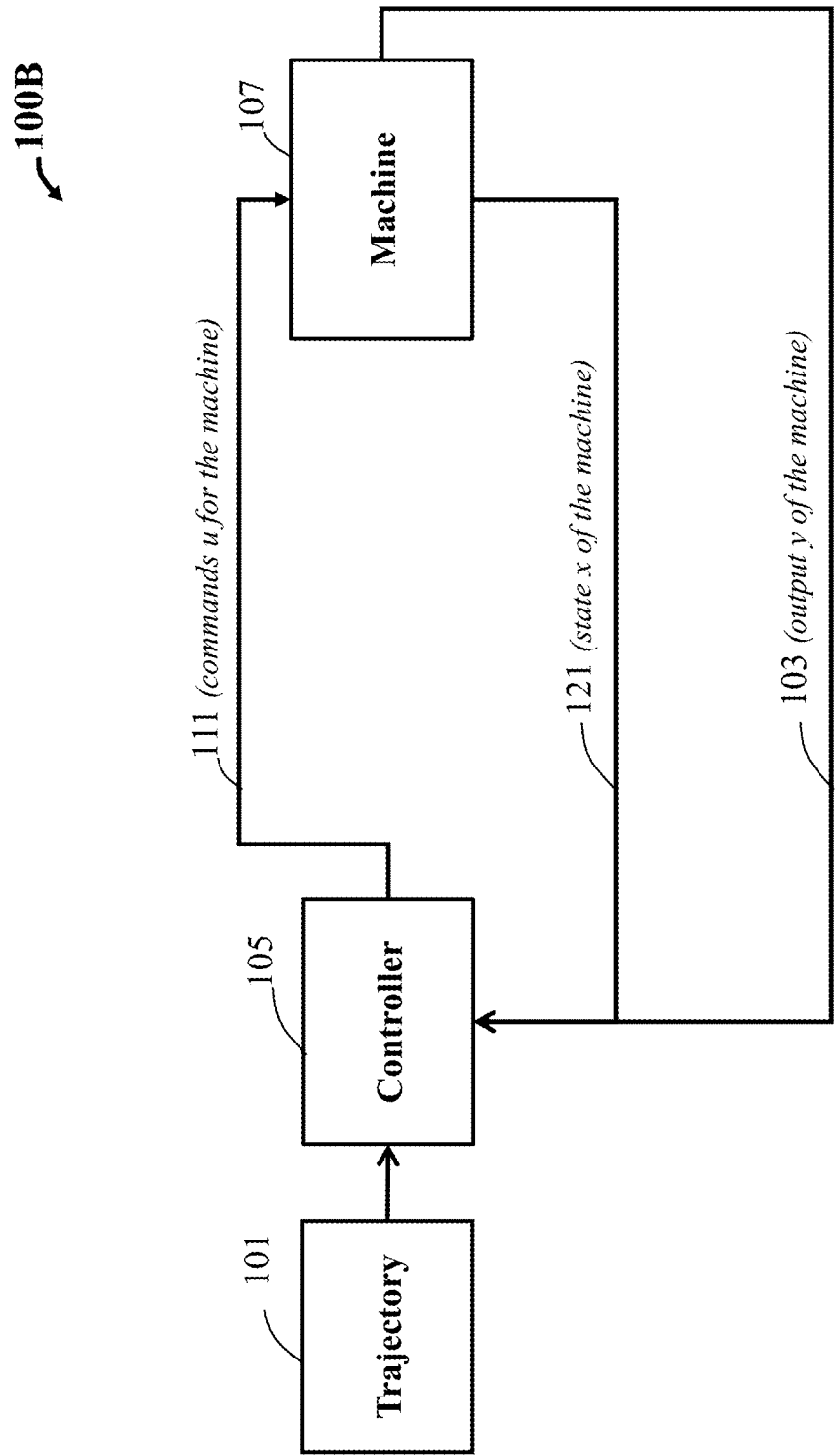
FIG. 1B is a schematic illustrating an example machine connected to a controller, according to embodiments of the present disclosure.

FIG. 1B is a schematic illustrating an example machine connected to a controller, according to embodiments of the present disclosure. For example, FIG. 1B shows an example machine 107, such as laser processing machine, that can be connected to controller 105, e.g., the MPC controller. The MPC is a receding horizon controller based on iterative, finite-horizon optimization, wherein the optimization can be performed over a prediction horizon that is shifted forward at each sample time. Further, the controller 105 can be programmed according to a model of the machine 107. The model can be a set of equations representing changes of a state 121 and output 103 of the machine 107 over time as functions of current and previous commands 111, and previous outputs 103. The model can include constraints (see 204 of FIG. 2A) that represent physical and operational limitations of the machine 107.

During operation, the controller 105 receives a trajectory 101 indicating the reference behavior of the machine 107. The trajectory 101 can be, for example, a desired motion or desired spatial pattern. In response to receiving the trajectory 101, the controller 105 generates commands u 111 for the machine 107. In response to the command, the machine 107 updates the output y 103 and the state x 121 of the machine.

Figure 1C:
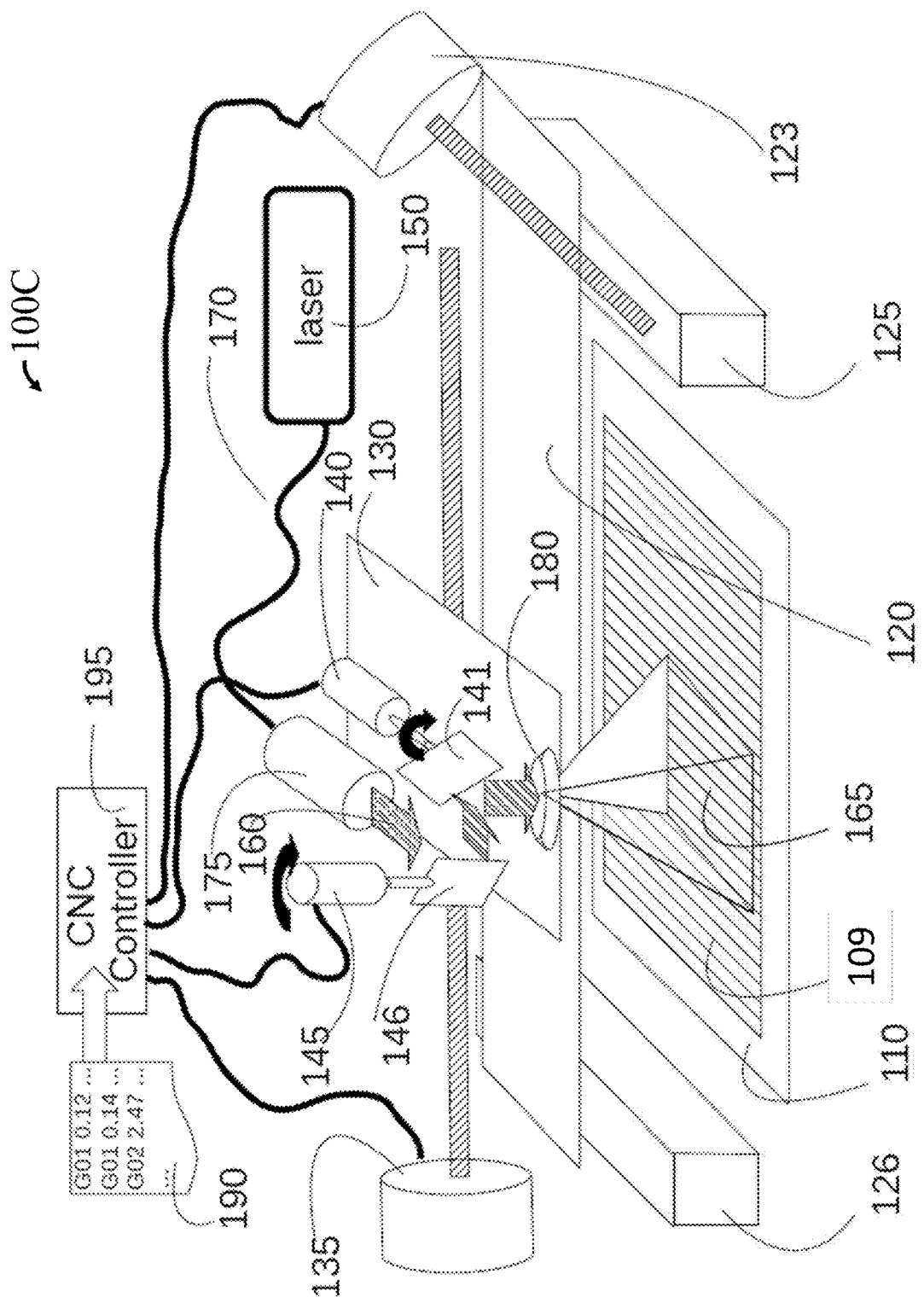
FIG. 1C is a schematic illustrating some components of a processing machine, according to embodiments of the present disclosure.

FIG. 1C is an isometric view of an example processing machine, according to embodiments of the present disclosure. For example, FIG. 1C the processing machine can be a laser processing machine 150 for a method 100B. The worktool can be a laser beam, and the spatial pattern is a cutting pattern, and wherein the laser processing machine positions the laser beam according to the processing pattern. The laser processing machine is shown for illustration purpose and the design of this machine is not intended to limit the scope of the invention. The laser processing machine includes a slow actuator and a fast actuator, examples of which are provided below.

Referring to FIG. 1C, the workpiece 109 is supported on a beam dump 110 beneath a gantry 120. The gantry moves on rails 125 and 126 along a first direction, e.g., along a Y-axis. The gantry 120 is moved along the first direction by a first servo motor and a first screw 123. A platform 130 is arranged on the gantry 120 and moves with the gantry along the first direction, e.g., along a Y-axis. Also, the platform 130 is moved along a second direction, e.g., along an X-axis, by a second servo motor and a second screw 135. In this embodiment, the gantry 120, the first servo motor and the first screw 123, and the second servo motor and the first screw 135 form a motion system for moving the platform in a plane parallel to the workpiece 109 along the first and the second direction. However, other embodiments of the invention use different types of the prismatic joints to move the platform. For example, the first prismatic joint can include a first direction linear drive motor, and the second prismatic joint can include a second direction linear drive motor.

Still referring to FIG. 1C, the galvano-mirror assembly, e.g., a two-axis galvano scan head having two orthogonal galvano drives, i.e., a first drive 140 and a second drive 145, a first mirror 141 and a second mirror 146, is arranged on the platform 130. A third motion of the first mirror 141 caused by the first driver 140 positions the laser beam along a third direction, and a fourth motion of the second mirror 146 caused by the second driver 145 positions the laser beam along a fourth direction.

In the context of this description, the gantry 120 is a first actuator, or the slow actuator, with large operating range, and the galvano assembly is a second actuator, or the fast actuator, with smaller operating range. However, such usage is not intended to limit the scope of the claims. For example, in some variations the first actuators is the fast actuator, and the second actuator is the slow actuator, and in some cases both actuators may be realized by gantries moved by servo motors, or both may be realized by galvano scanners.

Still referring to FIG. 1C, in various embodiments, the galvano-mirror assembly is arranged on the platform such that the third direction is fixed with respect to the first direction, e.g., along a Y-axis, and the fourth direction is fixed with respect to the second direction, e.g., along an X-axis. For example, in one embodiment, the first direction coincides with the third direction, and the second direction coincides with the fourth direction. In another embodiment, the first direction forms an angle of 45 degrees with the third direction, and the second direction forms the angle of 45 degrees with the fourth direction.

The galvano assembly can be affixed to the platform in order to fix the direction of motion. Alternatively, the galvano assembly can be arranged on the platform rotationally, such that the mutual orientations of the first, the second, the third, and the fourth directions can be fixed before, or during the operation of the laser processing machine. In the context of this invention, the galvano assembly is the second stage, or fast stage, with small operating range.

Still referring to FIG. 1C, the laser processing machine can include a laser 150 that directs a cutting laser beam 160 to the first 141 and the second 146 mirrors of the galvano-mirror assembly via an optical fiber 170 and a collimator 175. In an alternative embodiment, the laser beam is directed to the galvano assembly via diagonal mirrors moving along the Y-gantry and X-axis platform. However, other variations are also possible.

The collimated cutting laser beam 160 is directed by the mirrors through a focusing module 180 for focusing the laser beam on the workpiece, producing a combined X-axis and Y-axis galvano assembly scan area 165 on the workpiece 109, and cutting the workpiece 109. An example of the focusing module 180 is a field-flattening F-theta lens or a non-telecentric F-theta lens. A size of the workpiece 109 can be greater than the galvano scan area 165 due to the motion of the platform.

Still referring to FIG. 1C, in some embodiments, the control module includes a computer numerical control (CNC) controller 195. The controller 195 can includes a processor for performing the calculations and the control. Other embodiments can use different types of controllers. The control module may control the motion system and the galvano assembly according to precomputed G-code 190 that defines a trajectory of positions of the laser beam or can performs the computations to decide how to control the machine. For example, the computations can define successive positions for the X-axis platform 130, the Y-axis gantry X-motion galvano assembly and mirror 141, and Y-motion galvano assembly and mirror 146.

In general, the machines are built with actuators that have different dynamical behaviors. For example, the first actuator has usually significantly less acceleration than the second actuator, due to the difference in the displaced worktool. From this difference, the indicated names of slow and fast actuators are derived.

Figure 1D:
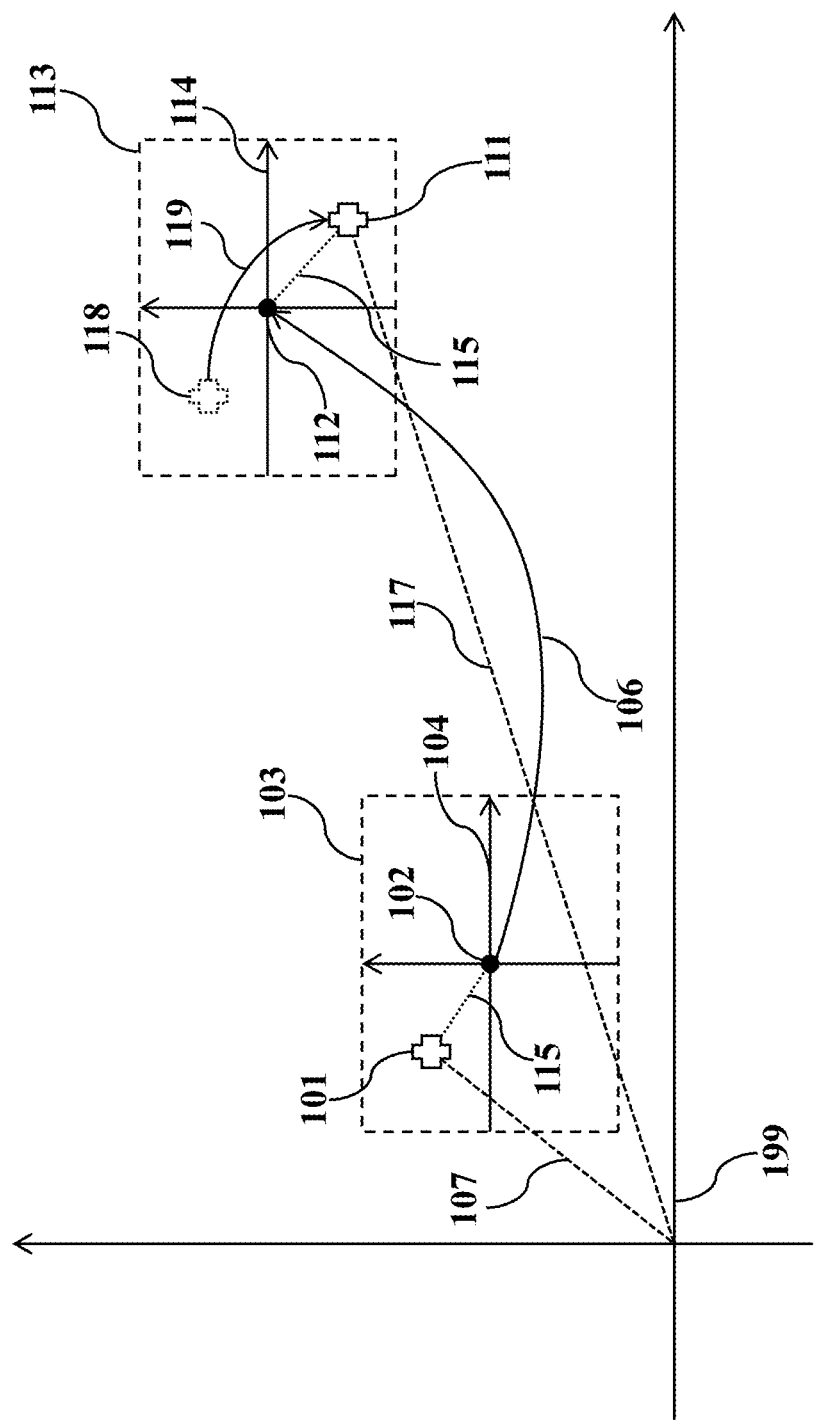
FIG. 1D is a schematic illustrating a relation between a position of the laser beam and positions achieved by a slow and a fast actuation, according to embodiments of the present disclosure.

FIG. 1D is a schematic illustrating a relation between a position of the laser beam and positions achieved by a slow and a fast actuation, according to embodiments of the present disclosure. For example, FIG. 1D shows the relation between the position of the laser beam and the positions achieved by the slow and fast actuation. Given the global coordinate frame 199, the global position 107 of the laser beam 101 is determined based on the position of the slow actuator 102, and the relative position of the fast actuator 115 in the relative coordinate frame 104 centered at the position of the slow actuator 102. Reachable positions for the fast actuator and for the laser beam are bounded by an area 103. Following a movement 106 for the position 112 of the slow actuator, the area of reachable position for the fast actuator and for the laser beam is 113. Following a concurrent movement 119 of the fast actuator, the laser beam is not at the position 118, but is in the position 111, with relative position 115 in frame 114 centered on the position of the slow actuator and a position 117 in the global coordinate frame 199.

Thus, the machine operating range at any time is centered at the current position of the slow actuator, and has size equal to the size of the operating range of the fast actuator. By changing the position of the slow actuator, the current machine operating range is also changed, thus realizing an overall operating range, which is the composition of the operating range of the slow actuator and the operating range of the fast actuator.

Still referring to FIG. 1D, some embodiments of the invention consider constraints of the slow and fast actuators of the laser processing machine in determining trajectory and controlling the operation of the machine. For the purpose of the clarity of this disclosure, the laser processing machine with redundant actuator is arranged such that the slow actuator has a larger operating range and smaller acceleration limits than the fast actuator, while the fast actuator has a smaller operating range and larger acceleration limits than the slow actuator.

Some embodiments control the machine subject to constraints that guarantees the feasibility of tracking the reference trajectory with an error defined by bounds of a tracking error. For example, some embodiments control the machine using an optimization-based receding horizon control. A non-limited example of the receding horizon control is a Model Predictive Control (MPC).

Still referring to FIG. 1D, some embodiments are based on recognition that the redundant processing machine, such as redundant laser processing machine, can be regarded as a constrained dynamical system executing a trajectory that tracks a reference trajectory. The dynamics of the actuators of the laser processing machine defines the dynamical system, the laser cutting pattern can potentially define a reference trajectory that the machine needs to track, and the constraints on the actuation actuators of the machine result in constraints on the states and inputs of the dynamical system.

For example, the slow actuator can generate the trajectory so that certain binding constraints are satisfied, which makes it possible to generate the fast actuator trajectory as a difference of the feasible reference trajectory and the slow actuator trajectory. For the redundant processing machine, the binding constraints require that the difference between the slow actuator position and the reference trajectory position at every time (or at least in a sufficiently fine sampled grid of time instants) are always smaller or equal than the range of the fast actuator.

Figure 2A:
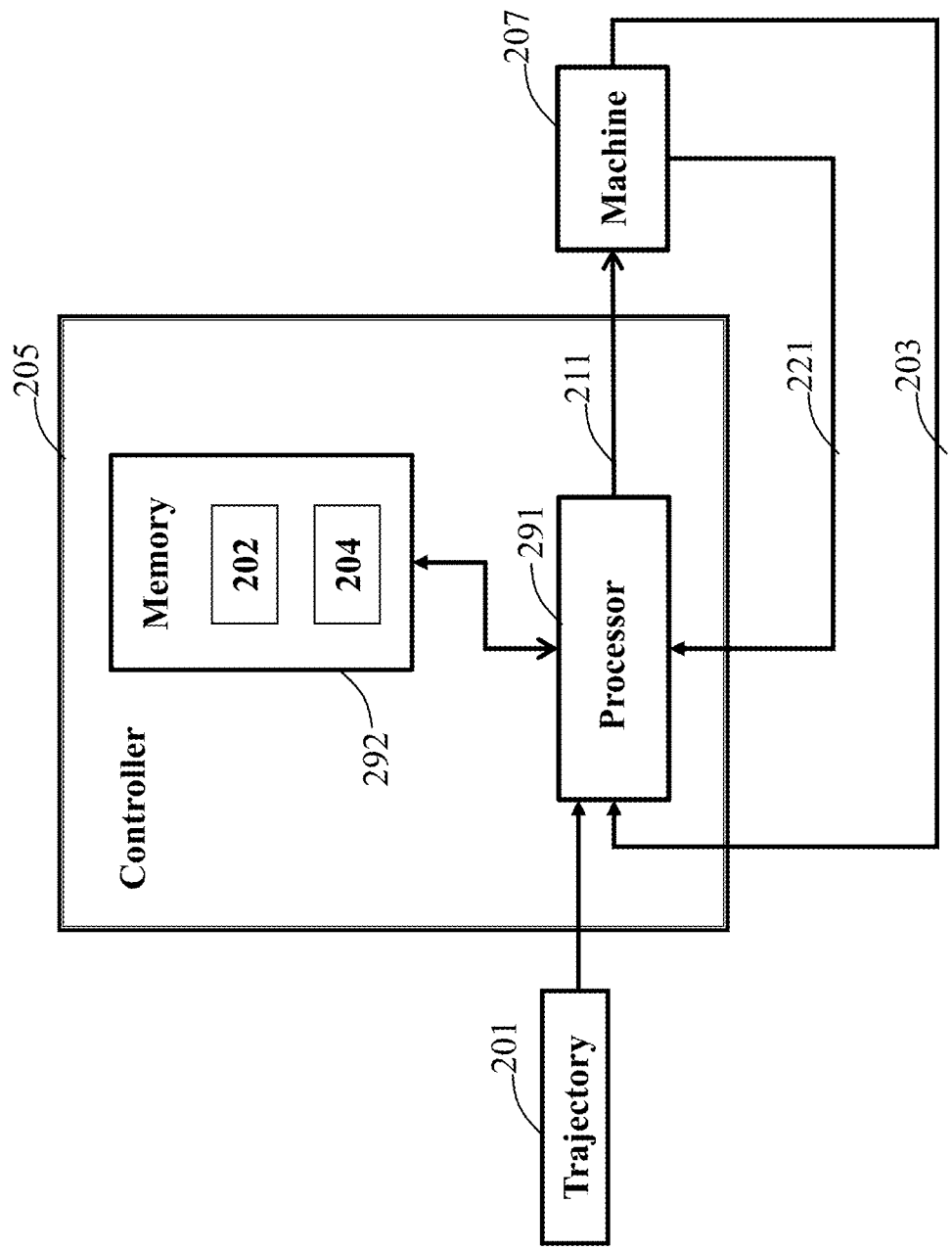
FIG. 2A is a block diagram illustrating a controller and some components of a processing machine, according to embodiments of the present disclosure.

FIG. 2A shows a block diagram of the controller 205 according one embodiment of the invention. The controller 205 includes a processor 291 connected to a memory 292 for storing the model of the machine 202 and the constraints 204, such as constraints of the machine, e.g., physical and specification constraints, constraints on a transient of the reference trajectory and constraints on bounds of a tracking error. For example, the constraints on the transient of the reference trajectory can include a possible type of changes of the state of the reference trajectory, rates of the change of the state of the reference trajectory among others. The bounds of the tracking error can include the allowed difference between a function the state of the machine and a function of the state of the reference trajectory. The function can be, e.g., identity function, linear combination.

FIG. 2B and FIG. 2C are graphs illustrating a timing diagram of an operation of a processing machine, according to embodiments of the present disclosure For example, the controller 205 of FIG. 2A generates the command 211 of FIG. 2C for the machine to perform the reference operation while enforcing the constraints 242 of FIG. 2B. The controller at each time k 241 of FIG. 2B and FIG. 2C, solves a finite time optimal control problem for a prediction interval 244 of FIG. 2C, e.g., from the current time until the N next times. The constraints can include constraints of the machine including regions of feasible states and outputs 242 of FIG. 2B and feasible commands 243 of FIG. 2C.

Some embodiments of the invention provide a system and a method for controlling operations of redundant processing machine including a fast actuator and a slow actuator for jointly positioning a worktool such as a laser beam according to a reference trajectory. The method according to various embodiments ensures a feasibility of the processing the reference trajectory satisfying constraints on the processing and movements of the actuators.

Still referring to FIG. 2A to FIG. 2C, for example, some embodiments are based on recognition that a redundant laser processing machine can fail to process a given reference trajectory. For example, the reference trajectory can require the slow actuator to move with the speed exceeding its limitations. Accordingly, there is a need to modify the reference trajectory in the time domain, while preserving the reference trajectory in the spatial domain. For example, one embodiment increases the time of positioning the laser beam between at least some points of the reference trajectory to ensure the feasibility of the processing.

Some embodiments of the invention provide a method suitable for modifying the time domain of the reference trajectory in real time, i.e., concurrently with the controlling of the laser processing machine. To that end, it was recognized that the time domain of the reference trajectory can be modified sequentially for each period of time. Such recognition allows selecting the period of time to be less than the entire duration of the reference trajectory based on, e.g., computational power of a processor of the laser processing machine to enable the processor to modify the time domain of the reference trajectory concurrently with the controlling the movement of the actuators.

Figure 3B:
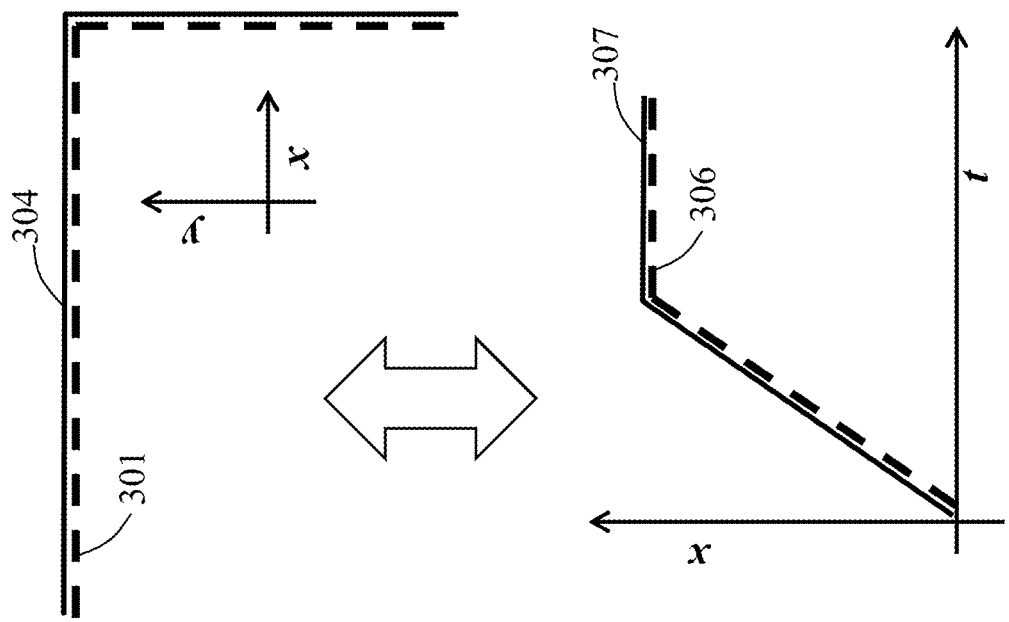
FIG. 3A and FIG. 3B are graphs illustrating motion profiles of an actuator in spatial and time domains illustrating a problem addressed by some embodiments, according to embodiments of the present disclosure.
Figure 3A:
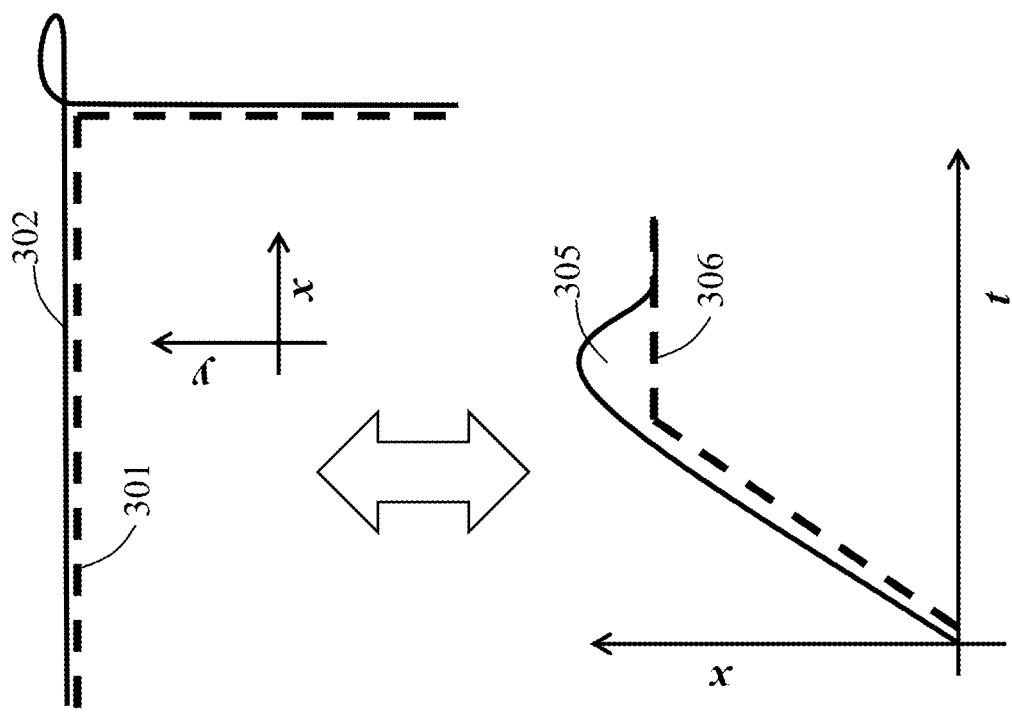

FIG. 3A and FIG. 3B show motion profiles of an actuator in spatial and time domains illustrating the problem addressed by some embodiments, according to embodiments of the present disclosure. For example, FIG. 3A and FIG. 3A show a pattern 301 of the processed points in space and a trajectory 306 of the processed points in time, only for the x axis. When reaching the corner, if the machine is processing sequentially at high speed and if the processing position is not properly stopped, then points 302 of FIG. 3A outside of the original pattern 301 of FIG. 3A are processed. The points 302 of FIG. 3A corresponds to points 305 of FIG. 3A on time trajectory, because by operating sequentially on portion of the pattern, the machine may not have enough time to come to a stop before processing points outside the pattern. Instead, referring to FIG. 3B, under the same conditions, a machine that can stop the processing position can stop at the corner and hence can generate trajectory 304 of FIG. 3B with time trajectory 307 of FIG. 3B where no additional points other than those of the original pattern are processed. Thus, the capability to stop at the last processed point guarantees that no additional points other than those of the original pattern are processed.

Figure 3D:
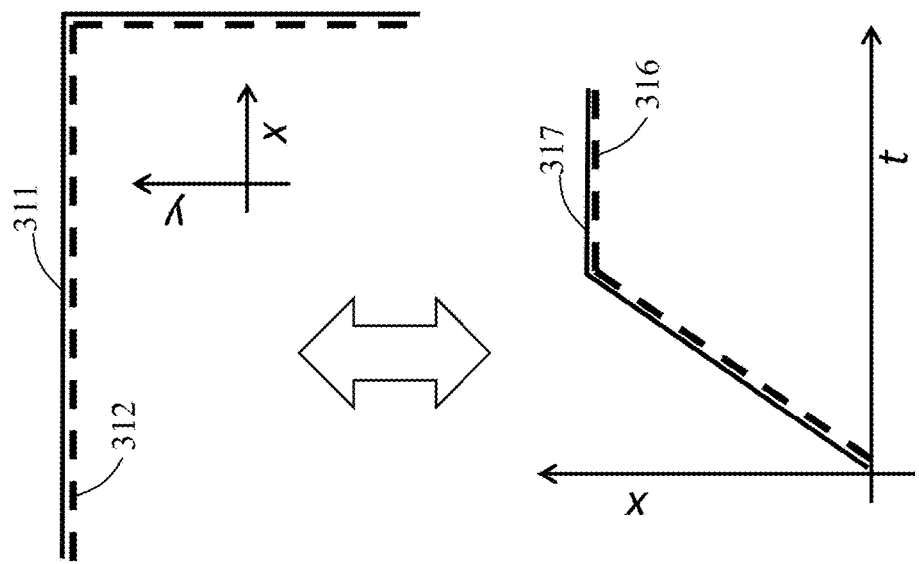
FIG. 3C and FIG. 3D are graphs illustrating motion profiles of an actuator in spatial and time domains illustrating principles of some embodiments employed to jointly process a reference trajectory using redundant actuators, according to embodiments of the present disclosure.
Figure 3C:
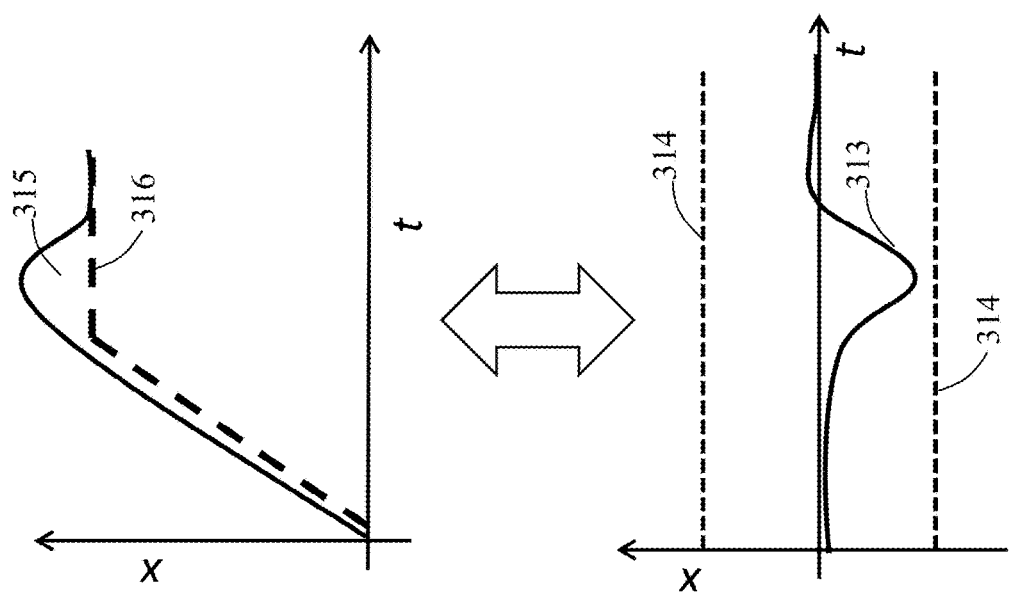

FIG. 3C and FIG. 3D are graphs illustrating motion profiles of an actuator in spatial and time domains illustrating principles of some embodiments employed to jointly process a reference trajectory using redundant actuators, according to embodiments of the present disclosure. For example, FIG. 3C and FIG. 3D show motion profiles of an actuator in spatial and time domains illustrating the principles of the solution employed by some embodiments to jointly process a reference trajectory using two actuators. Those embodiments can be based on the realization that sequential real-time trajectory generation can be obtained by guaranteeing that the worktool can be stopped on a point of the pattern while the slow axis is moving, while compensating for such motion with the fast axis.

Referring to FIG. 3C, the slow actuator generates the motion profile 315 of FIG. 3C following the trajectory 316 of FIG. 3C. The deviation is compensated by the motion profile of fast actuator 313 of FIG. 3C, so that the combination of motion of fast and slow actuators results in joint profile 317 of FIG. 3D, which results in pattern 311 of FIG. 3D for the reference trajectory 312 of FIG. 3D. However, the fast actuator can compensate the deviation of the slow actuator only within its range denoted by the constraints 314 of FIG. 3C.

Some embodiments of the invention are based on recognition that sequential processing and/or modification of the reference trajectory imposes two requirements for modifying each segment of the reference trajectory for the duration of each time period. The first requirement ensures the feasibility of processing the segment of the reference trajectory such that the constraints on the processing and the movements of the actuators are satisfied. This requirement follows from the initial objective of the embodiments to ensure the feasibility of processing the portion of the trajectory. However, the second requirement, which follows for the sequential processing of the reference trajectory, ensures that the processing of the segment of the trajectory does not move the laser processing machine in such a state that necessitate the violation of the constraints for processing any future portion of the trajectory. If these two requirements are satisfied, the sequential modification can generate the entire feasible reference trajectory.

Still referring to FIG. 3A to FIG. 3D, some embodiments of the invention are based on a realization that if the speed of processing of the portion of the reference trajectory places the processing machine in such a state that allows the processing machine to maintain the worktool at the last processed point for indefinite period of time without violation of the constraints, such speed allows the machine to adapt to any variation of the future portions of the reference trajectory. It was realized that the ability of dynamics of the processing machine to preserve its state after the current processing ensures that the processing does not jeopardize the future processing, and thus such a processing satisfies the second requirement.

Figure 4A:
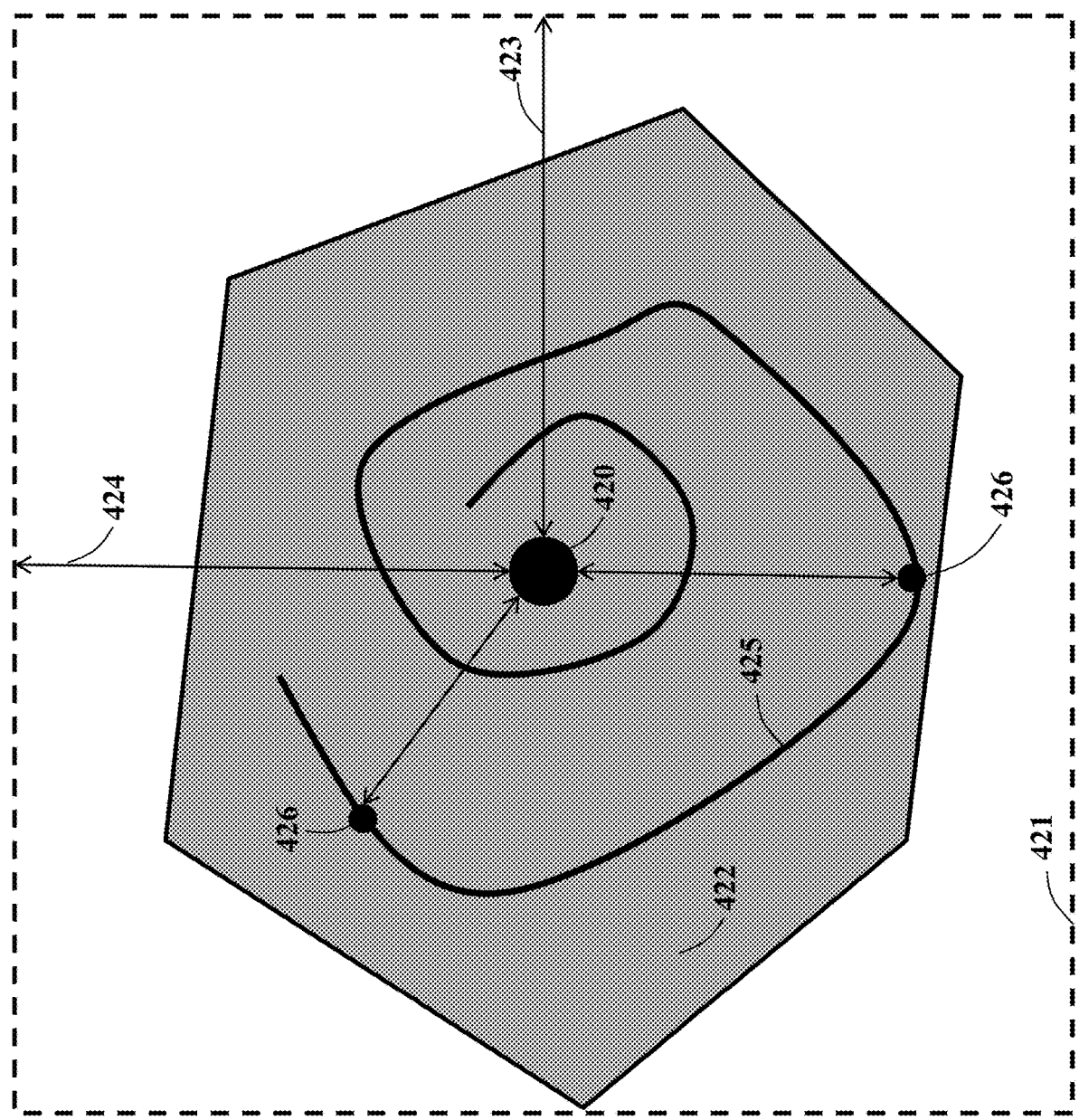
FIG. 4A is a schematic illustrating positioning the worktool at a point while the slow actuator still moves and with a fast actuator subject to range constraints, according to embodiments of the present disclosure.

FIG. 4A shows a schematic of positioning the worktool at a point 420 while the slow actuator still moves and with a fast actuator subject to range constraints. The region 422 is included in the range of the fast actuator 421, determined by its ranges along x 423 and y 424 axis. The region 422 is invariant for the slow actuator dynamics, meaning that the positions 425 of the slow actuator can be forced to remain in the area 422, so that the distance between the point 420 and any point selected from the positions 425, e.g., a point 426, is less than the range of the fast actuator 423 and 424.

Figure 4B:
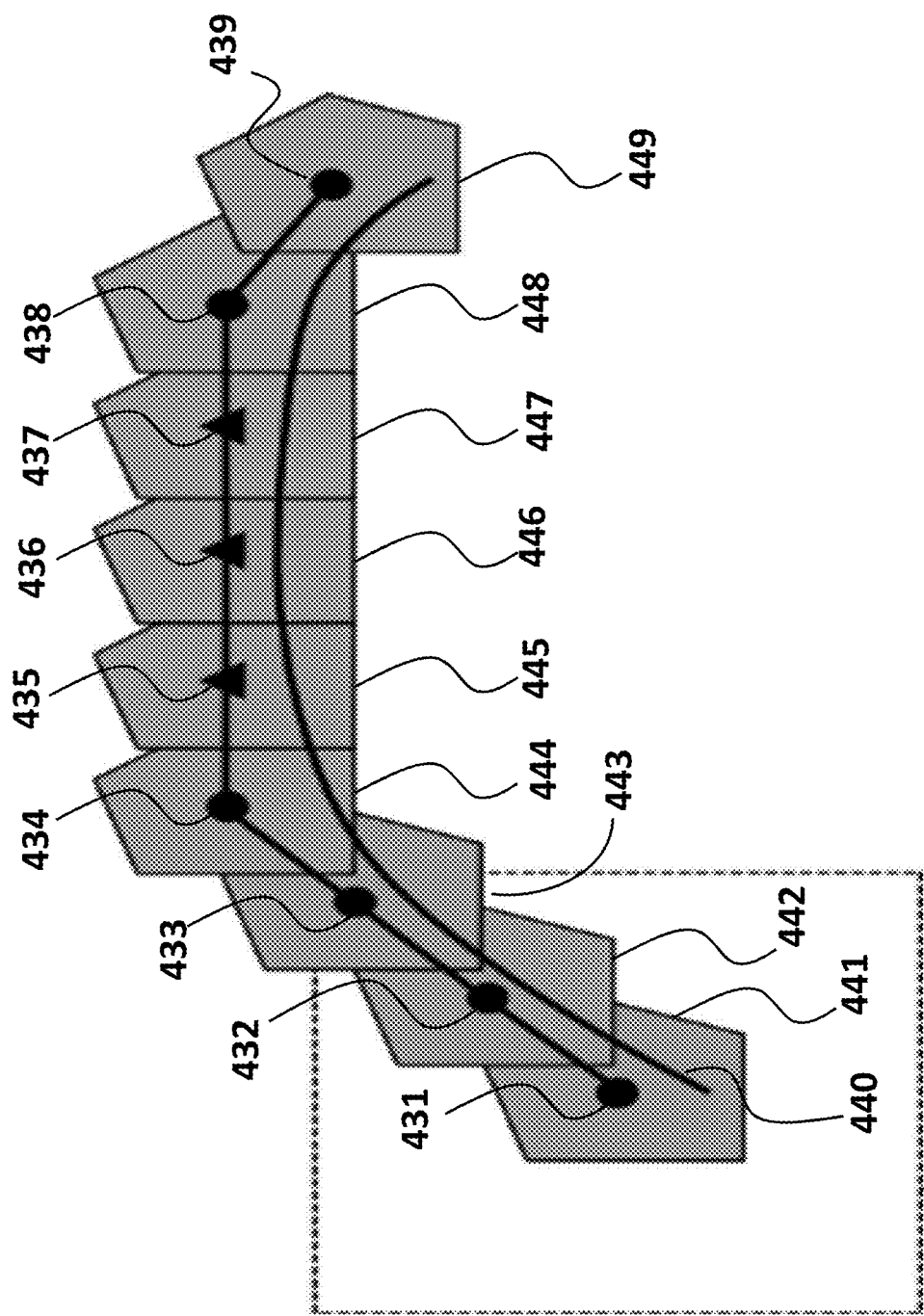
FIG. 4B is a schematic illustrating positioning the worktool at a sequence of points, according to embodiments of the present disclosure.

FIG. 4B shows a schematic of positioning the worktool at a sequence of points 431, 432, 433, 434, 435, 436, 437, 438, 439 to be processed such that the worktool can stop at any points of the sequence without violating the constraints. Points 431, 432, 433, 434, 438, and 439 are points where a machining operation takes place, as indicated by the circle. Points 435, 436, and 437 are points where no machining operation takes place. The positions of the slow actuator 440 is maintained in a sequence of invariant regions, 441, 442, 443, 444, 445, 446, 447, 448, 449 internal to the ranges of the fast actuators 450 centered at the points 431 through 439 to be processed. Only the ranges of the fast actuators 450 centered on the point 431 is shown for clarity. In this example, the system uses single invariant set for all parts of the pattern. The sequence of processing points is selected such that the path of the slow actuator 440 always remains in the invariant regions.

Control Architecture for Coordinated Processing

Some embodiments implement the trajectory generation and control of the actuators by a specific real-time architecture that processes the reference trajectory feasible for the fast actuator motions but ignoring the fast actuator range for the fast actuators without range constraints. In order to obtain trajectories with high efficiency, i.e., fast processing of the desired pattern, it was realized the reference trajectory needs to be modified using information from the predicted motion of the slow actuator. In particular, from a segment of the reference trajectory, the fastest feasible reference trajectory for the slow actuator can be selected using a predicted future state of the slow actuator, thus ensuring the largest amount of points are processed, i.e., that the processing goes as fast as possible for the currently predicted conditions.

For example, one embodiment models the dynamics of the slow actuator as $$y_s^i(t)=T_s^i(t)*u_s^i(t), i\in\{x,y\} \quad (1)$$

where the superscripts x and y refer to the x and y axis of the machine, * is the convolution operator in time, $y_s$ is the position of the slow actuator, $u_s$ is the position command to the slow actuator and $T_s$ is the transfer function of the slow actuator in time, which is of order greater or equal to two. The transfer function models at least two derivatives of the position to be asymptotically stable of unitary DC-gain, i.e., if the command is constantly equal to a value, the position of the actuator approaches the value infinitely close, in a possibly large amount of time.

The slow actuators are subject to constraints on position, acceleration, and velocity and command that can be expressed in the time domain as $$u_{s,min}^i \leq u_s^i(t) \leq u_{s,max}^i$$

$$p_{s,min}^i \leq y_s^i(t) \leq p_{s,max}^i$$

$$v_{s,min}^i \leq \dot{y}_s^i(t) \leq v_{s,max}^i$$

$$a_{s,min}^i \leq \ddot{y}_s^i(t) \leq a_{s,max}^i, i=\{x,y\} \quad (2)$$

Similarly, one embodiment models the dynamics of the fast actuator in the frequency domain (Laplace domain) as $$y_f^i(t)=T_f^i(t)*u_f^i(t), i\in\{x,y\} \quad (3)$$

where the superscripts x and y refer to the x and y axis of the machine, $y_f$ is the position of the slow actuator, $u_f$ is the position command to the slow actuator and $T_f$ is the transfer function of the slow actuator in time, which is of order greater or equal to two in order to model at least two derivatives of the position, and to be asymptotically stable of unitary dc-gain, i.e., if the position command is constantly equal to a value, the position of the actuator approaches the value infinitely close, in a possibly large amount of time.

The fast actuators are subject to constraints on position, accelerations and velocity and command that can be expressed in the time domain as $$u_{f,min}^i \leq u_f^i(t) \leq u_{f,max}^i$$

$$p_{f,min}^i \leq y_f^i(t) \leq p_{f,max}^i$$

$$v_{f,min}^i \leq \dot{y}_f^i(t) \leq v_{f,max}^i$$

$$a_{f,min}^i \leq \ddot{y}_f^i(t) \leq a_{f,max}^i, i=\{x,y\} \quad (4)$$

The feasible trajectory of the points to be processed is described as a time trajectory $$r^i(t), i=\{x,y\}, \quad (5)$$

which imposes the combined slow and fast actuator constraint $$y_s^i(t)+y_f^i(t)=r^i(t), i=\{x,y\}. \quad (6)$$

Because, in some embodiments, the fast actuator is moving much faster than the slow actuator such constraints are simplified into $$p_{f,min}^i \leq y_s^i(t)-r^i(t) \leq p_{f,max}^i, i=\{x,y\}, \quad (7)$$

which indicates that the difference between the positions of the points to be processed and the slow actuator position is smaller than the range of the fast actuator, so that the combination of slow and fast actuator can be placed at the positions of the points to be processed.

Some embodiments of the invention determine the reference trajectory for the processed points of the machine by first obtaining a first trajectory for the processed points based on abilities of the fast actuator, $$q^i(t), i=\{x,y\} \tag{8}$$

and then modifying the trajectory of Equation (8) depending on the characteristic of the processed points motion and on the state of the slow actuator such that the combination of the slow actuator and fast actuator can process such trajectory. Such a modification determines the trajectory of Equation (5) such that processing is guaranteed to satisfy the constraints of Equations (2), (4), (7). For instance, the first trajectory of Equation (8) can be generated by ignoring the range constraints of the fast actuator to represent the operation of an ideal machine with infinitely large range for the fast actuator. The first trajectory is then the fastest that the machine can process the pattern, but is not feasible due to ignoring the range constraints of the fast actuators. Then, the trajectory of Equation (5) is generated by modifying in real-time the first trajectory (8) to make the modified trajectory feasible, based on the processed point motion and on the state of the slow actuator, so that the range constraints of the fast actuator can be satisfied.

Figure 5:
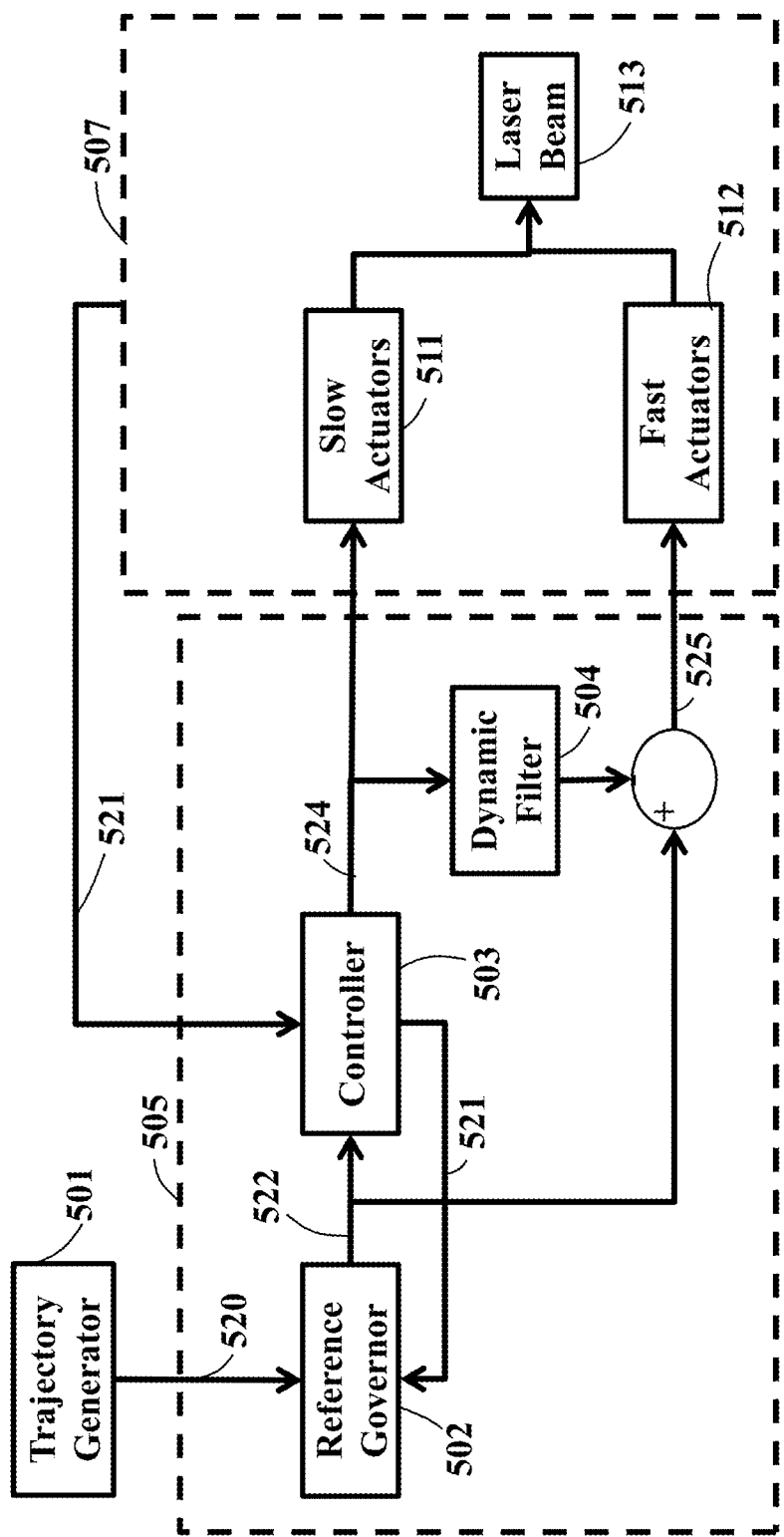
FIG. 5 is a block diagram illustrating a control system for coordinated control of redundant processing machine, according to embodiments of the present disclosure.

FIG. 5 shows a block diagram of a control system 505 for coordinated control of redundant processing machine 507, such as a laser processing machine, including the slow actuator 511 and the fast actuator 512 for jointly positioning the worktool, e.g., a laser beam 513. The trajectory generator module 501 generates a reference trajectory 520 based on the characteristics of the fast actuator, while ignoring the range constraints of the position of the fast actuator to achieve the spatial pattern of the processed points. The reference trajectory 520 is the fastest, but potentially infeasible.

Segments of the trajectory 520 are provided to a reference governor module 502 that based on a predicted state 521 of the slow actuator generates a modified trajectory 522 as described above. In some embodiments, the modified trajectory 522 is the fastest moving trajectory that the motion of the combined slow and fast actuators can achieve while satisfying the constraints of Equations (1)-(4), (7) and maintaining the spatial position of the processed point to be the same as for the trajectory of Equation (8). The modified trajectory 522 is provided to a controller 503 that using the state of the machine 521 selects a current command 524 for motion the slow actuators 511. The command for the fast actuators 512 is obtained by subtracting from the modified trajectory the command for the slow actuators 524 filtered by a filter 504. The commands to the fast and slow actuators cause movements of the actuators that determine the motion of the laser beam 513. Because the constraints (1)-(4), (7) are satisfied and the modified trajectory has the same spatial pattern than the original reference trajectory, the machine processes the desired spatial pattern while moving as fast as possible within its physical and operational limitations.

Generation of Reference Trajectory from Spatial Pattern

One embodiment generates the initial reference trajectory of Equation (8) from the spatial pattern of points $\{(p^x(i),p^y(i))\}_{i=1}^{np}$ to be processed by the machine. Different techniques can be used to generate the reference trajectory while ignoring the slow actuator and the range constraints of the fast actuator. For instance given maximum value of processing tracking error, processing velocity, and processing acceleration of the fast actuator, $\varepsilon_e$, $\varepsilon_v$, $\varepsilon_a$ the maximum rate of motion $Dr_{max}$ of the reference trajectory to satisfy those bounds are computed as $$Dr_{max} = \max\left\{\frac{\varepsilon_e}{G_e}, \frac{\varepsilon_v}{G_v}, \frac{\varepsilon_a}{G_a}\right\},$$

where $G_e$, $G_v$, $G_a$ are worst case gains for tracking error, velocity, and acceleration which are computed for example for the fast actuator, from Equation (3). Thus, the trajectory from processing point $(p^x(i), p^y(i))$, processed at time $t_i$ to the next point $(p^x(i+1), p^y(i+1))$ is computed by first computing the shortest travel time $$t_{i,i+1} = \max\left\{\frac{|p^x(i+1) - p^x(i)|}{Dr_{max}}, \frac{|p^y(i+1) - p^y(i)|}{Dr_{max}}\right\}$$

and then by computing the trajectory of Equation (5) such that $$r^x(t_i) = p^x(i), r^y(t_i) = p^y(i),$$

$$r^x(t_i t_{i,i+1}) = p^x(i+1), r^y(t_i t_{i,i+1}) = p^y(i+1).$$

Optionally, the intermediate points of the first trajectory can be generated, for instance, by linear interpolation.

Reference Governor

The slow axis with dynamics of Equation (1) can be represented in state space and in discrete time with period is as $$x^i(k+1) = A^i x^i(k) + B^i u_s^i(k)$$

$$y_s^i(k) = C^i x^i(k), i \in \{x,y\}, \tag{9}$$

where k is a time instant when the signals are sampled, i.e., the index of the control cycle, u is the machine input, y is the machine output, x is the state of the machine, and A, B, C, are parameters of the model. For example, $x = [y_s \; \dot{y}_s \; \ddot{y}_s]'$ and A, B, C are matrices of appropriate dimensions. It is realized that for model (9) obtained from (2) if the trajectory (5) is used as the input to the slow actuator model (9), i.e., $r^i(k) = u_s^i(k)$, $i = \{x, y\}$.

The constraints (2) and (10) can be written as $$x_{min}^i \leq x^i(k) \leq x_{max}^i$$

$$u_{s,min}^i \leq u_s^i(k) \leq u_{s,max}^i,$$

$$p_{f,min}^i \leq Cx^i(t) - u^i(t) \leq p_{f,max}^i, i = \{x,y\} \tag{10}$$

Figure 6:
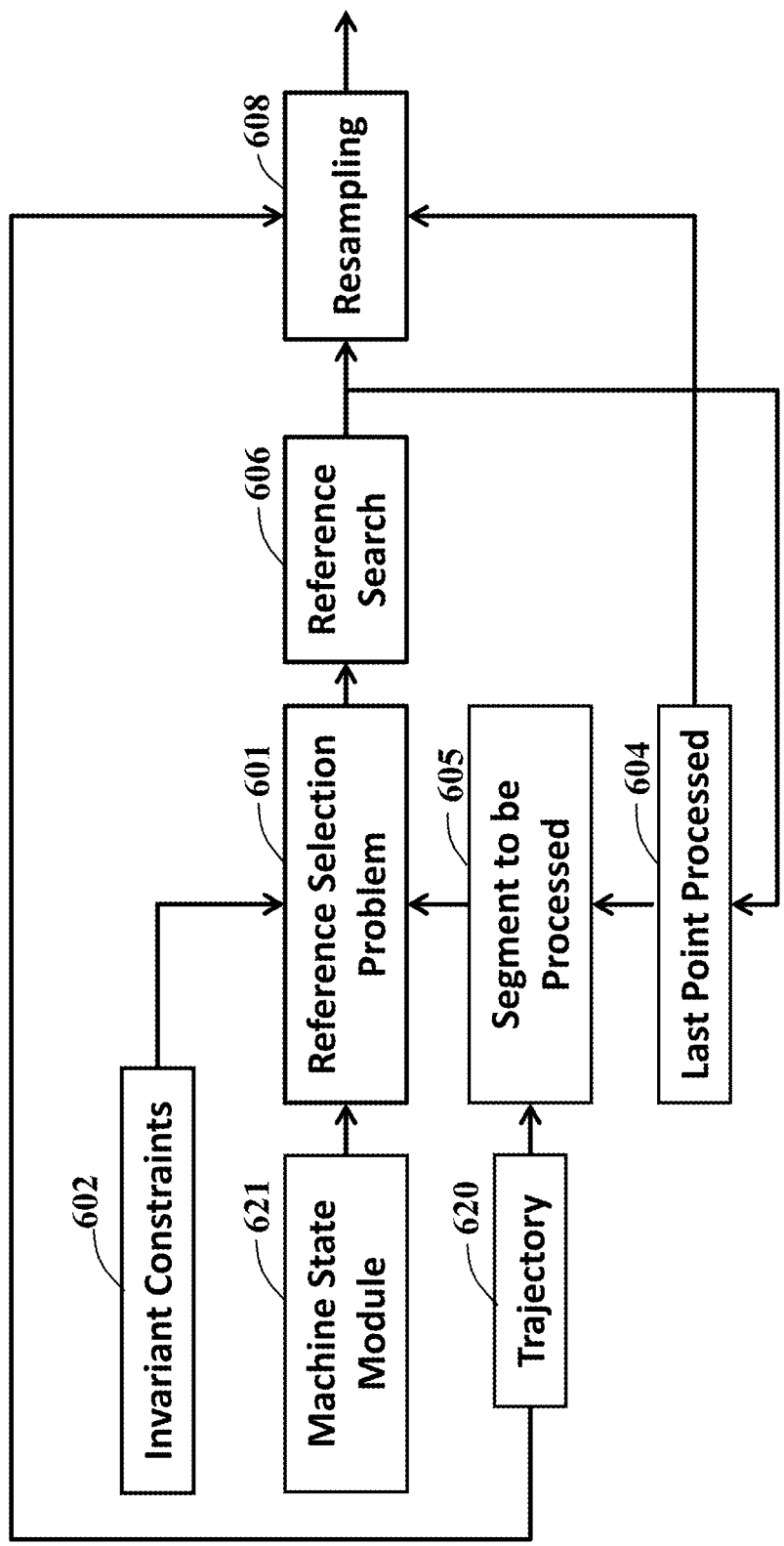
FIG. 6 is a block diagram illustrating a reference governor modifying sequentially the reference trajectory, according to embodiments of the present disclosure.

FIG. 6 shows a block diagram of the reference governor 602 modifying sequentially the reference trajectory according to one embodiment of the invention. The reference governor operates by cycles of duration $t_s$. At every cycle indexed by k, the machine processes P points each time, spaced by $t_f$ seconds, where $t_s = t_f P$ that covers the time interval between $t_s(k-1)$ and $t_s k$. The reference governor 602 determines the segment of P points in the trajectory, to be processed 605 in the current time period $t_s$ from the reference trajectory 620. The reference governor determines the last processed point 604 in the segment, defining the subset of points according to $$\{(\hat{q}^x(j), \hat{q}^y(j))\}_{j=0}^P, \tag{11}$$

where $(\hat{q}^x(0), \hat{q}^y(0))$ is the last processed point.

The segment of points to be processed 605, the predicted state of the machine $\hat{x}^i$, $i \in \{x, y\}$ 721 at the beginning of the cycle when the points need to be processed, and the invariant constraints 602 are used to formulate the reference selection problem 601 according to $$H_{inv}^i \hat{x}^i + S_{inv}^i u_s^i \leq K_{inv}^i, i \in \{x,y\} \tag{12}$$

The reference selection problem 601 is searched 606 to determine the largest subset or sub-segment of points that can be processed subject to invariant constraints 602 that guaranty satisfying Equations (1), (2), (7) using a single command for the slow actuator according to $$M = \max_{j \in [0,P]} j \quad (13)$$
$$\text{s.t.} \quad H_{inv}^x \hat{x} + S_{inv}^x \hat{q}^x(j) \leq K_{inv}^x,$$
$$H_{inv}^y \hat{x} + S_{inv}^y \hat{q}^y(j) \leq K_{inv}^y,$$

The reference governor also guarantees that if the single actuator command is maintained forever, the laser beam can be always directed to the last point of the sub-segment, thus ensuring that the processing position can be stopped with no additional point outside of the original pattern.

In one embodiment, the reference selection problem is solved by a reference search 606. For instance, one embodiment initializes M=0 and at every iteration to check if j=M+1 satisfies the inequality conditions. If so, M=M+1, and the operations are repeated until either M=P or the inequality conditions are not satisfied.

Alternatively, one embodiment can initialize j=P and at every iteration try to check if j satisfies the inequality conditions. If so or if M=0, the embodiment stops the iterations, otherwise the embodiment sets j=M−1 and the iterations are repeated.

Additionally, one embodiment performs a bisection search. If j=P satisfies the inequality conditions, then M=P and the algorithm stops. Otherwise, initialize $j_l$=0, and we let $j_u$=P. Then the embodiment sets j=round ($j_l$+$j_u$/2) and checks if the inequality conditions are satisfied. If so, $j_l$=j, otherwise $j_u$=j. The embodiment stops when ($j_u$−$j_l$)<2 and sets M=j.

The index M determines the final point of the largest subsegment 607 that can be processed ($\hat{q}^x$(M),$\hat{q}^y$(M)). From the final point of the largest subsegment of points that can be processed 607, the current last point 604, and the trajectory 620, P points are generated by a resampling 608 with time spacing $t_f$ seconds, according to $$\{(\tilde{r}^x(j),\tilde{r}^y(j))\}_{j=0}^P,$$
$$(\tilde{r}^x(0),\tilde{r}^y(0))=(\hat{q}^x(0),\hat{q}^y(0)),$$
$$(\tilde{r}^x(P),\tilde{r}^y(P))=(\hat{q}^x(M),\hat{q}^y(M)), \quad (14)$$

between the last processed point 604 and the final point of the largest subsegment of points that can be processed 607.

The resampled points are sent as a modified reference for the time interval when $\{(\hat{q}^x(j),\hat{q}^y(j))\}_{j=0}^P$ need to be processed. The modified reference can be associated with a processing time instant and result in a modified segment of the trajectory of Equation (5) during time interval between $t_s$(k−1) and $t_s$k.

In this way, the processing speed of the modified trajectory is reduced without changing the shape of the trajectory itself. The original trajectory processed P points at a certain distance in space in $t_s$ seconds. If between the current laser point 604 and the final point of the largest subsegment of points that can be processed there are only M<P points of the original trajectory, the length accomplished in $t_s$ seconds by the modified trajectory is shorter. Thus, by resampling the M points into P>M points with time spacing $t_f$ seconds, still processes P points with time spacing $t_f$ seconds, but these points are closer to each other because the total distance is shorter. Thus shorter distance in the same amount of time results in the processing having slowed down the reference trajectory speed to a level that can be executed by the machine with multiple actuators subject to constraints.

Figure 7:
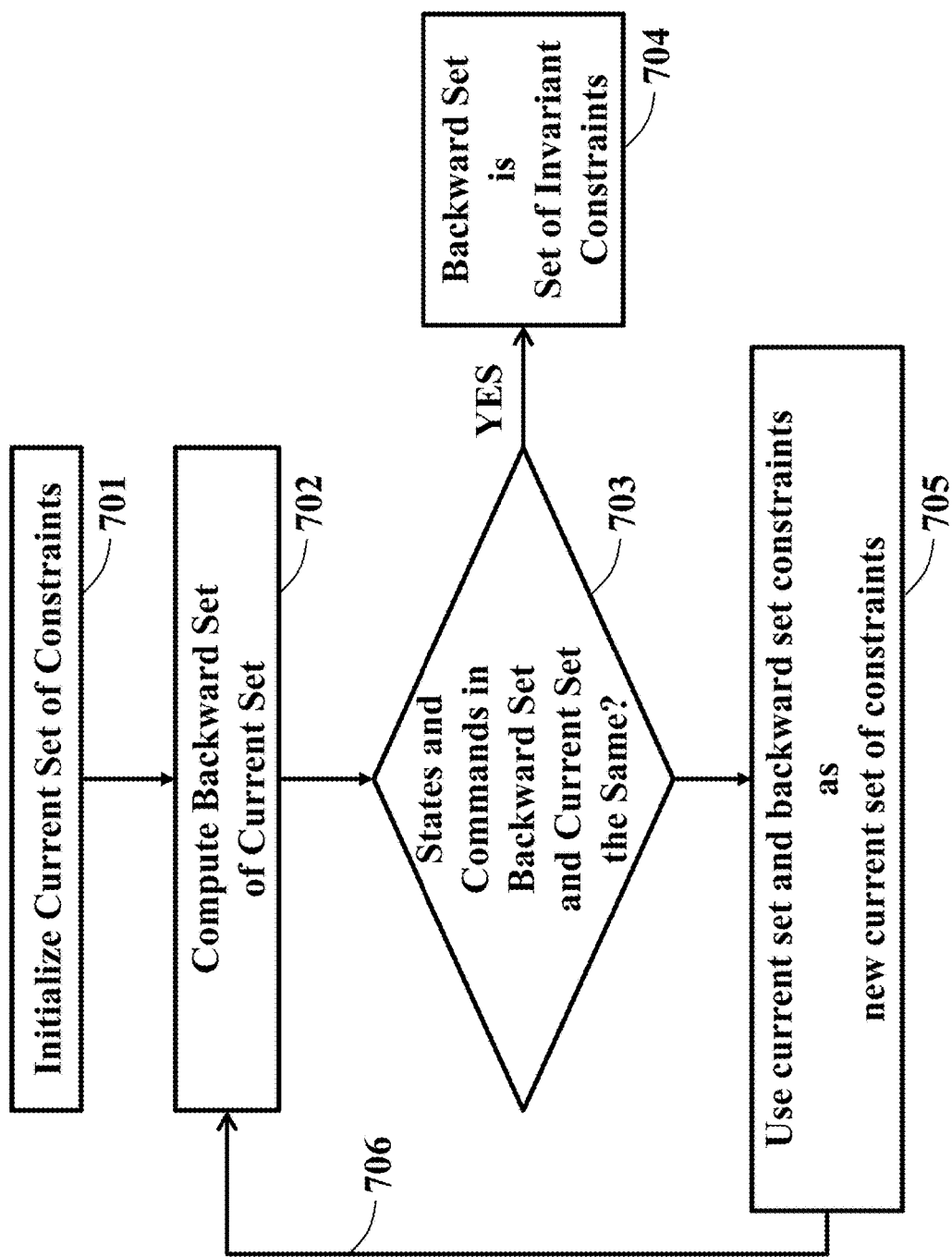
FIG. 7 is a block diagram illustrating a method for determining the invariant constraints, according to embodiments of the present disclosure.

FIG. 7 shows a block diagram of a method for determining the invariant constraints 702 according to one embodiment. In one embodiment, the invariant constraints are constructed from dynamics of the slow actuator for all couples ($x^i$,$u_s^i$), i∈{x,y} of slow actuators states and slow actuator commands such that if the command is applied from the state of the machine, the actuator dynamics satisfies the constraints (2), and the constraint (7), where $$r^i(t)=u_s^i, \forall t, i \in \{x,y\}.$$

For example, a current set of constraints is initialized 701 as the constraints (2), and (7) where $r^i$(t)=$u_s^i$, ∀t, i∈{x, y}. From the current set of constraints, a set of constraints determining the backward reachable set is computed 702 as the constraints that determine the states and constant commands that after a one-step evolution of the system dynamics (1) satisfy the current set of constraints. If 703 the set of states and commands described by the backward reachable set includes or equals the set of states and commands described by the current set, then 704 the current set of constraints is the set of invariant constraints. Otherwise 705, the set of constraints determining the backward reachable set and the current set of constraints together are used as the new current set of constraints, in a repetition 706 of the method.

FIG. 8A illustrates the functioning of the standard reference governor with respect to a machine trajectory. In this example the reference governor can process a window of up to M=10 samples of the reference trajectory per reference governor sample period. At time $t_0$ 801 all 10 of the M points in the window $W_0$ 805 are constraint admissible and thus the reference governor selects the next P=M points to be processed. The predicted state is updated and the process repeats through t1 810 during which the points in $W_1$ 811 are processed, t2 812 during which the points in $W_2$ 813 are processed, and t3 814 during which the points in $W_3$ 815 are processed. At times t1, t2, and t3 all 10 points in the corresponding windows were constraint admissible and therefore the reference governor advances by 10 points at each time instance.

FIG. 8B continues to illustrate the functioning of the standard reference governor. At time t4 816 the reference governor processes the points in $W_4$ 817 and determines that only the first 5 points are constraint admissible. Thus, the reference governor selects the next P=5 points to be processed. At t5 818 only the next P=5 points from window $W_5$ 819 are again constraint admissible and the reference governor once again selects next five points to be processed in the next time interval.

Receding Horizon Reference Governor

FIG. 9A illustrates the functioning of the receding horizon reference governor with respect to a machine trajectory. In this example the receding horizon reference governor is designed to work over a horizon of 5 windows, where each window can process up to M=10 points. At time t0 901 the RHRG processes the points in W0 902 and determines that all 10 of the points in the window are constraint admissible. Therefore, time t1 903 is assigned to the last point of W0. The point at t1 is also the starting point of W1 904. The state estimate is updated at time t1 which allows the reference governor to determine how many points in W1 are constraint admissible, which in this case is once again 10.

Therefore, time t2 905 is assigned to the last point of W1 and the starting point of the next window W2 906. The state estimate is updated at time t2 which allows the reference governor to determine how many points in W2 are constraint admissible, which in this case is once again 10. This process continues identically for W3 908. In the final window W4 910 of the horizon the RHRG uses the state estimate at time t4 909 to determine that only the next five points are constraint feasible, and time t5 911 is assigned to the 5$^{th}$ point after the point assigned to time t4. The point assigned to time t5 is the final point for processing within the 5 window horizon. For the first 4 windows in the processing horizon the RHRG is able to select the maximum number of points for processing, which means that the machine can operate at full speed. However, in W4, only five of ten points can be processed which means that the machine must reduce the processing speed by 50%. This large reduction in processing speed is undesirable because it results in a large acceleration. The RHRG mitigates this issue as follows.

FIG. 9B illustrates the process of employed to mitigate large changes in processing speed. After processing the entire horizon as in FIG. 9A the average number of points processed per window is computed and rounded down to the closest integer value. If any window in the horizon contains fewer points than the rounded average, the rounded average value is selected as the new maximum number of points that can be processed M in a window, and the entire horizon is reprocessed. In this case the rounded average number of points processed per window is 9 and the number of points processed in W4 910 of FIG. 9A is 5.

Therefore, M is set to 9 and the entire horizon is reprocessed. The reprocessing proceeds from t0 901 in FIG. 9B. When run on W0 902, W1 904, W2 906, and W3 908, the RHRG selects the new maximum number of points M=9 for processing in each window. The times t1 903, t2 905, t3 907, and t4 909 are assigned to new points accordingly. Unlike in FIG. 9A, when the RHRG processes W4 910 in FIG. 9B, it is now able to process the maximum allowed number of points M=9. It is important to note that the actual point that t5 911 is assigned to is the same in both FIG. 9A and FIG. 9B. The difference is that all windows now contain an equal number of points. After all of the windows are processed, the rounded average number of points processed per window is again calculated. As before, if any window contains fewer than the rounded average number of points, the maximum allowed points per window would again be set to the rounded average and the process would repeat. In the case illustrated in FIG. 9B none of the windows now contain fewer than the rounded average number of points so the process can terminate. The effect of this process is to spread the 50% slowdown that occurred in W4 910 of FIG. 9A across all of the windows in FIG. 9B. Stated another way, a 50% slowdown of short duration is transformed into a 10% slowdown of a longer duration. The result is lower acceleration than would occur with the standard reference governor.

FIG. 9C illustrates the next step in the process. After the RHRG finishes processing all of the windows in the horizon starting at t0 901, the horizon is advanced by one window, such that W0 902 now begins at t1 903. The points between t0 and t1 now occur in the past and are discarded from the horizon. The RHRG proceeds sequentially through the windows as before, selecting the largest number of constraint feasible points, less than or equal to M, for processing in each window. The values of M are saved as the horizon advances, such that in this example M=9 for W0 902, W1 904, W2 906, and W3 908, and M=10 for W4 910 because it has not been processed previously. In this example all the points in each window are constraint feasible. After the last window W4 910, the RHRG checks to see if the number of points processed in each window is less than the rounded average, determines that none of the windows fall below the rounded average, and advances the horizon.

FIG. 9D illustrates another step where the horizon is advanced. W0 902 now begins at t2 905. M=9 for W0 902, W1 904, and W2 906 as a result of earlier processing. M=10 for W3 908 because, although it was processed as part of the previous horizon, a slowdown was not necessary, and M=10 for W4 901 because it is the newest window in the horizon and has never been processed before.

Features

Aspects of the present disclosure can include the reference governor updates all windows of points of the receding horizon upon detecting violation of the constraints at an infeasible point within one window of the receding horizon by selecting a subset of points from a sequence of points of the reference trajectory within the receding horizon from the first point of the sequence till the infeasible point. Expanding units of time separating subsequent points in the subset to produce a modified segment of the reference trajectory having the subset of points processed for the period of time allocated for the entire receding horizon. Wherein the reference governor, upon detecting violation of the constraints at an infeasible point within one window of the receding horizon, updates the points by assigning the processing time allocated for the entire reseeding horizon to a feasible portion of the receding horizon ending at the infeasible point. Wherein the reference governor partitions the feasible portion of the receding horizon into the same number of windows as a number of windows in the receding horizon and stretch the relative time for positioning the worktool according to a processing time of the window of the receding horizon.

Another aspect can include a sampler for resampling the updated reference trajectory on the uniform timescale. An aspect can also include wherein the processing machine includes redundant actuators for jointly positioning the worktool along each axis of motion, wherein the redundant actuators include a fast actuator and a slow actuator, wherein a range of motion of the slow actuator is greater than a range of motion of the fast actuator, and wherein acceleration and velocity constraints of the fast actuator are greater than acceleration and velocity constraints of the slow actuator. Wherein a trajectory generator to generate the reference trajectory as a trajectory for the fast actuator with a range of motion of the slow actuator. Wherein the trajectory generator generates a trajectory for the slow actuator to place the updated reference trajectory within the range of motion of the fast actuator. Also an aspect that a trajectory generator to generate the reference trajectory using a model predictive control (MPC) optimizing a cost function subject to the constraints.

Aspects of the present disclosure can include the redundant actuators include a fast actuator and a slow actuator. Wherein a range of motion of the slow actuator is greater than a range of motion of the fast actuator. Wherein acceleration and velocity constraints of the fast actuator are greater than acceleration and velocity constraints of the slow actuator further comprising: determining the spatial domain and the time domain of the reference trajectory for positioning the worktool according to the processing pattern only with motion of an actuator having the acceleration and velocity constraints of the fast actuator and unlimited range of the motion; determining the subset of points for processing within the period of time with motion of the slow actuator capable to maintain the position of the worktool within the range of motion of the fast actuator from each point in the subset; determining a motion profile for the slow actuator for processing the subset of points within the period of time with an accuracy defined by the range of motion of the fast actuator; and determining a motion profile of the fast actuator based on a difference between the modified reference trajectory and the motion profile for the slow actuator. Wherein the determining the subset of points comprises: determining a point furthest from a first point in the set of points such that there is at least one motion profile for the slow actuator maintaining the worktool positioned by the slow actuator in a sequence of invariant regions defined by the range of the motion of the fast actuator centered at corresponding points in the subset from the first point to the furthest point in the set; and determining the subset of points to include all points in the set from the first point till the furthest point. Wherein the determining the furthest point uses linear or bisection search.

Another aspect can include the modifying the segment of the reference trajectory, comprises: resampling a fraction of the segment defined by the subset of points with a new set of points preserving a number of points in the set of points. Wherein another aspect can include the state of the processing machine is a current state of the processing machine, further comprising: measuring the current state of the processing machine to produce the state of the processing machine; and generating the control inputs to position the worktool on the modified segment of the reference trajectory.

Another aspect can include the state of the processing machine is a future state of the processing machine, further comprising: determining the future state of the processing machine using a current state and a previously determined sequence of predicted control inputs for the processing machine; determining a modified segment of the reference trajectory based on the future state of the processing machine, and segment of the reference trajectory; appending the modified segment of the reference trajectory to a set of modified segments of the reference trajectory to form a prediction of the reference trajectory along a future prediction horizon; determining a sequence of control inputs for positioning the worktool for the prediction horizon using a model of the processing machine; and selecting a subset of control inputs from the sequence of control inputs for positioning the worktool for a next control step.

Another aspect can include the processing machine is a laser processing machine, the worktool is a laser beam, and the pattern is a cutting pattern, and wherein the laser processing machine positions the laser beam according to the cutting pattern.

An aspect can include a control system for controlling an operation of a processing machine including redundant actuators for jointly positioning a worktool along each axis of motion, comprising processor for executing components of the control system, wherein the components comprises: a trajectory generator for determining a reference trajectory defined in a spatial domain by points for positioning the worktool according to a processing pattern and defined in a time domain by a relative time for positioning the worktool on each point of the reference trajectory; a reference governor for selecting, from a set of points forming a segment of the reference trajectory to be processed for a period of time, a subset of points corresponding to a fraction of the period of time and expanding units of time separating subsequent points in the subset to produce a modified segment of the reference trajectory having the subset of points processed for the period of time, wherein the subset of points is selected based on a state of the processing machine and locations of the points in the set such that the redundant actuators are capable to position the worktool at each point in the subset within the period of time and are capable to maintain the worktool at a point in the subset after the period of time while satisfying constraints on motion of the redundant actuators; and a controller for determining control inputs for the redundant actuators using the modified segment of the reference trajectory, wherein subject matter from independent claim 1 can be added to the above features.

An aspect can include wherein the redundant actuators include a fast actuator and a slow actuator, wherein a range of motion of the slow actuator is greater than a range of motion of the fast actuator, and wherein acceleration and velocity constraints of the fast actuator are greater than acceleration and velocity constraints of the slow actuator. Wherein the trajectory generator determining the spatial and the time domains of the reference trajectory for positioning the worktool according to the processing pattern only with motion of an actuator having the acceleration and velocity constraints of the fast actuator and unlimited range of motion. Wherein the reference governor determines the subset of points for processing within the period of time with motion of the slow actuator capable to maintain the position of the worktool around the point in the subset within a range of motion of the fast actuator. Wherein the controller determines a motion profile for the slow actuator for processing the subset of points within the period of time with an accuracy defined by the range of motion of the fast actuator. Wherein the control system includes a filter for determining a motion profile for the fast actuator based on the difference between the modified reference trajectory and the motion profile for the slow actuator.

Another aspect can include the reference governor determines a set of linear inequalities by constructing a subset of states of the processing machine and locations of the points such that when the locations of the points are continuously provided as command to the slow actuator from a current point of time to any future time, motion of the processing machine satisfies constraints on the motion at any future time. Wherein the set of linear inequalities defines invariant regions of states of the slow actuator for modified reference trajectory, wherein each invariant region is included in an admissible region of the states of the slow actuator defined by constraint on the motion of the slow actuator and the range of the fast actuator, and the invariant region is such that if the state of the processing machine and a current position of the worktool is in the invariant region and a position command to the slow actuator is constantly equal to a value, the constraints of the machine are guaranteed not to be violated. Wherein the controller determines the motion profile for the slow actuator by searching among points that satisfy constraints on the motion of the slow actuator to produce a set of motion profiles for the slow actuator, such that each motion profile for the slow actuator maintains the worktool position by the slow actuator in a sequence of invariant regions defined by the range of the motion of the fast actuator centered at corresponding points in the subset; and selecting the motion profile for the slow actuator reducing time for processing the pattern. Wherein the controller is a model predictive controller for using the modified segment of the trajectory as part of a prediction horizon for determining control inputs. Wherein the controller appends the modified segment of the reference trajectory to a set of modified segments of the reference trajectory to form the prediction horizon, determines a sequence of control inputs for positioning the worktool for the prediction horizon using a model of the processing machine; and selects a subset of control inputs from the sequence of control inputs for positioning the worktool for a next control step. Wherein the filter determines the motion profile of the fast actuator based on a state of the slow actuator, a state of the fast actuator, and the modified reference trajectory, such that a combination of motions of the slow actuator and the fast actuator is equal to the motion of the actuator having the acceleration and velocity constraints of the fast actuator and the unlimited range of motion for processing the modified reference trajectory.

A processing machine, comprising redundant actuators for jointly positioning a worktool along each axis of motion, the redundant actuators include a fast actuator and a slow actuator. Wherein a range of motion of the slow actuator is greater than a range of motion of the fast actuator. Wherein acceleration and velocity constraints of the fast actuator are greater than acceleration and velocity constraints of the slow actuator. A trajectory generator for determining spatial and time domains of a reference trajectory for positioning the worktool according to a processing pattern only with motion of an actuator having acceleration and velocity constraints of the fast actuator and unlimited range of the motion. A reference governor for modifying sequentially segments of the reference trajectory, such that the slow actuator is capable to process the modified segment of the reference trajectory within a period of time and is capable to maintain a position of the worktool around a point in the modified segment of the reference trajectory within the range of motion of the fast actuator for any time after the period of time. A predictive controller for determining a motion profile of the slow actuator for processing the modified segment within the period of time with an accuracy defined by the range of motion of the fast actuator. A filter for determining a motion profile of the fast actuator based on a difference between the modified reference trajectory and the motion profile for the slow actuator. Wherein the predictive controller uses the modified segment of the trajectory as part of a prediction horizon for determining control inputs defining the motion profile of the slow actuator.

Figure 10:
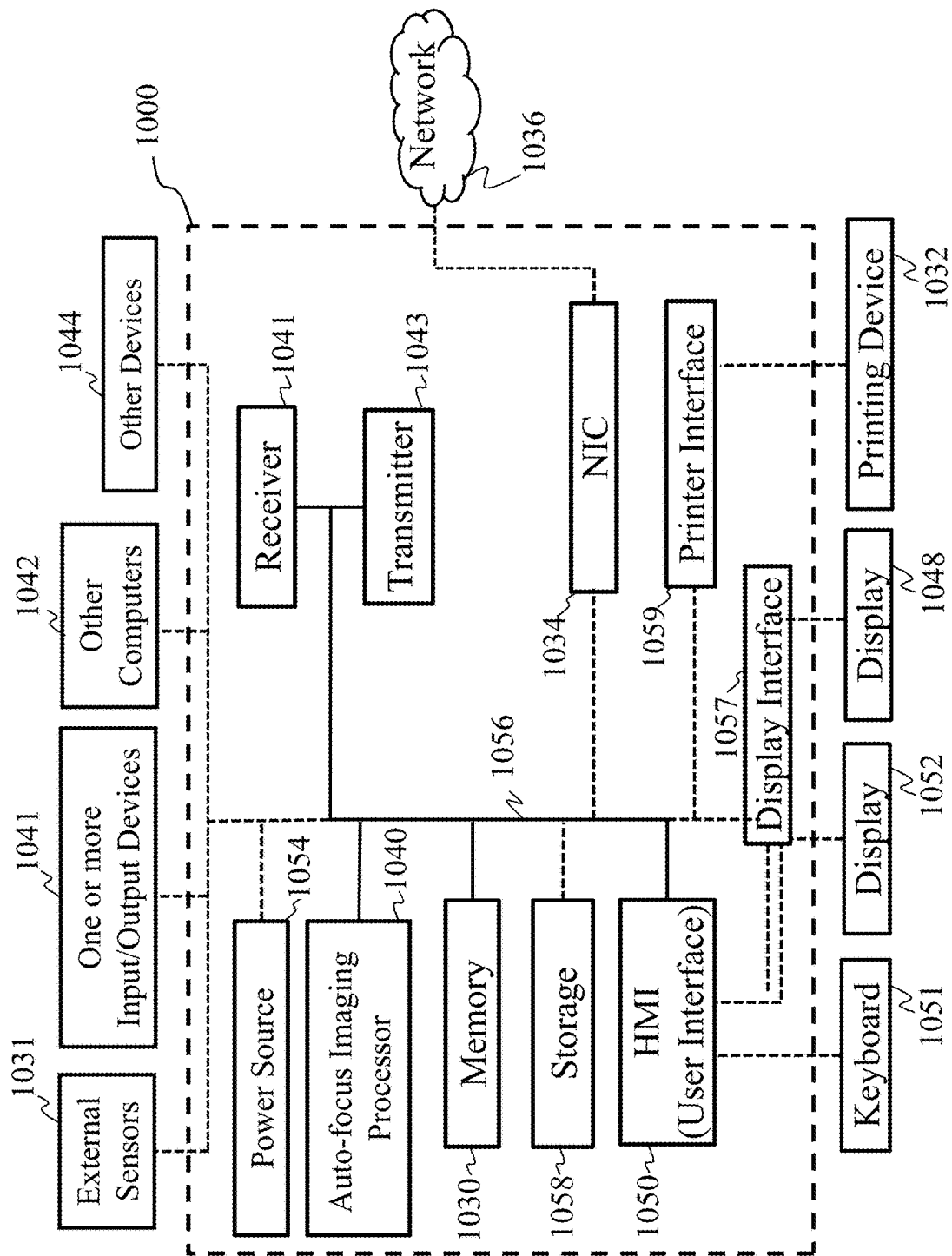
FIG. 10 is a block diagram illustrating the method of FIG. 1A, that can be implemented using an alternate controller, computer or processor, according to embodiments of the present disclosure.

FIG. 10 is a block diagram of an alternate controller for the processing machine system for positioning a worktool, according to embodiments of the present disclosure. The controller, processor or computer can store collected data in the memory 1030 that is processed by the processor 1040 of the controller, processor or computer 1000. The computer system 1000 can include a human machine interface or user interface 1050 that can connect the computer system to a keyboard 1051 and display device 1052. The computer system 1000 can be linked through the bus 1056 to a display interface 1057 adapted to connect the system 1000 to a display device 1048, wherein the display device 1048 can include a computer monitor, camera, television, projector, or mobile device, among others.

The computer system 1000 can include a power source 1054, depending upon the application the power source may be optionally located outside of the computer system. The auto-focus imaging processor 1040 maybe one or more processors that can be configured to execute stored instructions, as well as be in communication with the memory 1030 that stores instructions that are executable by the auto-focus imaging processor 1040. The auto-focus imaging processor 1040 can be a single core processor, a multi-core processor, a computing cluster, or any number of other configurations. The auto-focus imaging processor 1040 is connected through a bus 1056 to one or more input and output devices. The memory 1030 can include random access memory (RAM), read only memory (ROM), flash memory, or any other suitable memory systems.

Still referring to FIG. 10, the computer system 1000 can also include a storage device 1058 adapted to store supplementary data and/or software modules used by the auto-focus imaging processor 1040. For example, the storage device 1058 can store historical data relating to predesigned radar platform trajectories, radar operating frequency bandwidth, transmitted waveform, estimated signal-to-noise ratio, image data relating to target recognition, imaging results using simulated noisy data with different methods dealing with position errors, among other things. The storage device 1058 can include a hard drive, an optical drive, a thumb-drive, an array of drives, or any combinations thereof.

Still referring to FIG. 10, a printer interface 1059 can also be connected to the computer system 1000 through the bus 1056 and adapted to connect the computer system 1000 to a printing device 1032, wherein the printing device 1032 can include a liquid inkjet printer, solid ink printer, large-scale commercial printer, thermal printer, UV printer, or dye-sublimation printer, among others. A network interface controller (NIC) 1034 is adapted to connect the computer system 1000 through the bus 1056 to a network 1036. The image data or related image data, among other things, can be rendered on a display device, imaging device, and/or printing device via the network 1036.

Still referring to FIG. 10, the image data or related image data, among other things, can be transmitted over a communication channel of the network 1036, and/or stored within the computer's storage system 1058 for storage and/or further processing. Further, the image data or related image data may be received wirelessly or wire from a receiver 1041 or transmitted via a transmitter 1043 wirelessly or wire, the receiver 1041 and transmitter 1043 are both connected to the computer system 1000 through the bus 1056.

The computer system 1000 may be connected to external sensors 1031, one or more input devices 1041, other computers 1042 and other devices 1044. The external sensors 1031 may include motion sensors, inertial sensors, a type of measuring sensor, etc. The external sensors 1031 may include sensors for, speed, direction, distance to an object or location, etc. The input/output devices 1041 can include, for example, a keyboard, a scanner, a microphone, a stylus, a touch sensitive pad or display.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The embodiments of our present disclosure include coherent distributed radar imaging by allowing location ambiguities, and on autofocusing for a single sensor array by distributed sensing with multiple sensors. In particular, a multi-static radar imaging approach where one transmitting/receiving radar platform and multiple receiving radar platforms are moving towards a region of interest (ROI) with position perturbations. The embodiments of our present disclosure detect targets inside the ROI. Due to inaccurate positioning and motion errors, the actual array positions are perturbed up to several times a central radar wavelength. Although the image resolution of each sensor array may be low due to its small aperture size, a high-resolution image can be formed by jointly processing the outputs of all distributed arrays with well-compensated position errors. The embodiments of our present disclosure assume a sparse scene, and is realized iteratively by solving series of optimization problems for compensating position-induced phase errors, exploiting target signatures, and estimating antenna positions.

The embodiments of our present disclosure also provide for auto-focus radar imaging for generating a radar image of targets situated in an area of interest using a single moving transmit radar platform or combination transmitter/receiver along with multiple spatially distributed moving radar receiver platforms or receivers. The moving radar receivers are perturbed with unknown position errors up to several radar wavelengths.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What we claim is:

1. A control system for controlling an operation of a processing machine while or during positioning a worktool according to a processing pattern to machine a workpiece, comprising:
   a memory to store a reference trajectory defined in a spatial domain by a sequence of points for positioning the worktool and defined in a time domain by a relative time for positioning the worktool on each point of the reference trajectory;
   a sensor to determine a state of the processing machine;
   a reference governor to iteratively process the reference trajectory over a receding horizon of a sequence of future points in time including multiple windows of points, and to analytically update the relative time for positioning the worktool for at least some points of the reference trajectory within the receding horizon to satisfy constraints on the operation of the processing machine having the state, wherein the reference governor forms the receding horizon for processing during a current iteration by removing a window of points from the beginning of the receding horizon processed during a previous iteration and adding an unprocessed window of points at the end of the receding horizon, wherein the reference governor, upon detecting violation of the constraints at an infeasible point within one window of the receding horizon, updates the points by assigning the processing time allocated for the entire reseeding horizon to a feasible portion of the receding horizon ending at the infeasible point, wherein the reference governor partitions the feasible portion of the receding horizon into the same number of windows as a number of windows in the receding horizon and stretch the relative time for positioning the worktool according to a processing time of the window of the receding horizon; and
   a controller to control the operation of the processing machine using control inputs causing the worktool to track the updated reference trajectory.

2. The control system of claim 1, wherein the reference governor updates all windows of points of the receding horizon upon detecting violation of the constraints at an infeasible point within one window of the receding horizon by
- selecting a subset of points from a sequence of points of the reference trajectory within the receding horizon from the first point of the sequence till the infeasible point; and
- expanding units of time separating subsequent points in the subset to produce a modified segment of the reference trajectory having the subset of points processed for the period of time allocated for the entire receding horizon.

3. The control system of claim 1, further comprising:
a sampler for resampling the updated reference trajectory on the uniform timescale.

4. The control system of claim 1, wherein the processing machine includes redundant actuators for jointly positioning the worktool along each axis of motion, wherein the redundant actuators include a fast actuator and a slow actuator, wherein a range of motion of the slow actuator is greater than a range of motion of the fast actuator, and wherein acceleration and velocity constraints of the fast actuator are greater than acceleration and velocity constraints of the slow actuator.

5. The control system of claim 4, further comprising:
a trajectory generator to generate the reference trajectory as a trajectory for the fast actuator with a range of motion of the slow actuator.

6. The control system of claim 5, wherein the trajectory generator generates a trajectory for the slow actuator to place the updated reference trajectory within the range of motion of the fast actuator.

7. The control system of claim 1, further comprising:
a trajectory generator to generate the reference trajectory using a model predictive control (MPC) optimizing a cost function subject to the constraints.

8. A method for controlling an operation of a processing machine while or during positioning a worktool according to a processing pattern to machine a workpiece, the method comprising:
- using a memory having stored data including a reference trajectory defined in a spatial domain by a sequence of points for positioning the worktool, and defined in a time domain by a relative time for positioning the worktool on each point of the reference trajectory;
- using a sensor to determine a state of the processing machine;
- receiving, via an input interface in communication with the sensor, data regarding the state of the processing machine;
- using a reference governor to iteratively process the reference trajectory over a receding horizon of a sequence of future points in time including multiple windows of points, and to analytically update the relative time for positioning the worktool for at least some points of the reference trajectory within the receding horizon to satisfy constraints on the operation of the processing machine having the state, wherein the reference governor forms the receding horizon for processing during a current iteration by removing a window of points from the beginning of the receding horizon processed during a previous iteration and adding an unprocessed window of points at the end of the receding horizon, wherein the reference governor, upon detecting violation of the constraints at an infeasible point within one window of the receding horizon, updates the points by assigning the processing time allocated for the entire reseeding horizon to a feasible portion of the receding horizon ending at the infeasible point, wherein the reference governor partitions the feasible portion of the receding horizon into the same number of windows as a number of windows in the receding horizon and stretch the relative time for positioning the worktool according to a processing time of the window of the receding horizon; and
- controlling, via a controller, the operation of the processing machine using control inputs causing the worktool to track the updated reference trajectory, wherein the reference governor is in communication with the input interface and the memory.

9. The method of claim 8, wherein the reference governor updates all windows of points of the receding horizon upon detecting violation of the constraints at an infeasible point within one window of the receding horizon by
- selecting a subset of points from a sequence of points of the reference trajectory within the receding horizon from the first point of the sequence till the infeasible point; and
- expanding units of time separating subsequent points in the subset to produce a modified segment of the reference trajectory having the subset of points processed for the period of time allocated for the entire receding horizon.

10. The method of claim 8, further comprising:
generating via a trajectory generator, to generate the reference trajectory using a model predictive control (MPC) optimizing a cost function subject to the constraints.

11. A control system for controlling an operation of a processing machine while or during positioning a worktool according to a processing pattern to machine a workpiece, a memory to store a reference trajectory defined in a spatial domain by a sequence of points for positioning the worktool and defined in a time domain by a relative time for positioning the worktool on each point of the reference trajectory, wherein the points of the reference trajectory are sampled on a uniform timescale in the time domain and irregularly in the spatial domain, comprising:
- a sensor to determine a state of the processing machine;
- a reference governor to iteratively process the reference trajectory over a receding horizon of a sequence of future points in time including multiple windows of points, and to analytically update the relative time for positioning the worktool for at least some points of the reference trajectory within the receding horizon to satisfy constraints on the operation of the processing machine having the state, wherein the reference governor forms the receding horizon for processing during a current iteration by removing a window of points from the beginning of the receding horizon processed during a previous iteration and adding an unprocessed window of points at the end of the receding horizon, wherein the reference governor, upon detecting violation of the constraints at an infeasible point within one window of the receding horizon, updates the points by assigning the processing time allocated for the entire reseeding horizon to a feasible portion of the receding horizon ending at the infeasible point, wherein the reference governor partitions the feasible portion of the receding horizon into the same number of windows as a number of windows in the receding horizon and stretch the relative time for positioning the worktool according to a processing time of the window of the receding horizon; and a controller to control the operation of the processing machine using control inputs causing the worktool to track the updated reference trajectory.

12. The control system of claim 11, wherein the reference governor updates all windows of points of the receding horizon upon detecting violation of the constraints at an infeasible point within one window of the receding horizon by selecting a subset of points from a sequence of points of the reference trajectory within the receding horizon from the first point of the sequence till the infeasible point; and expanding units of time separating subsequent points in the subset to produce a modified segment of the reference trajectory having the subset of points processed for the period of time allocated for the entire receding horizon.

13. The control system of claim 11, further comprising:
a sampler for resampling the updated reference trajectory on the uniform timescale.

14. The control system of claim 11, wherein the processing machine includes redundant actuators for jointly positioning the worktool along each axis of motion, wherein the redundant actuators include a fast actuator and a slow actuator, wherein a range of motion of the slow actuator is greater than a range of motion of the fast actuator, and wherein acceleration and velocity constraints of the fast actuator are greater than acceleration and velocity constraints of the slow actuator.

15. The control system of claim 14, further comprising:
a trajectory generator to generate the reference trajectory as a trajectory for the fast actuator with a range of motion of the slow actuator, wherein the trajectory generator generates a trajectory for the slow actuator to place the updated reference trajectory within the range of motion of the fast actuator.

16. The control system of claim 11, further comprising:
a trajectory generator to generate the reference trajectory using a model predictive control (MPC) optimizing a cost function subject to the constraints.

* * * * *